United States Patent
Tomioka

(10) Patent No.: US 10,146,031 B2
(45) Date of Patent: Dec. 4, 2018

(54) ZOOM LENS AND IMAGING DEVICE

(71) Applicant: FUJIFILM Corporation, Tokyo (JP)

(72) Inventor: Ukyo Tomioka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/857,787

(22) Filed: Dec. 29, 2017

(65) Prior Publication Data
US 2018/0246304 A1    Aug. 30, 2018

(30) Foreign Application Priority Data
Feb. 24, 2017  (JP) .................. 2017-033131

(51) Int. Cl.
| | | |
|---|---|---|
| G02B 15/173 | (2006.01) | |
| G02B 27/64 | (2006.01) | |
| G02B 15/177 | (2006.01) | |
| H04N 5/232 | (2006.01) | |
| G02B 13/00 | (2006.01) | |
| G08B 13/196 | (2006.01) | |

(52) U.S. Cl.
CPC ....... *G02B 15/173* (2013.01); *G02B 13/0035* (2013.01); *G02B 15/177* (2013.01); *G02B 27/646* (2013.01); *H04N 5/23296* (2013.01); *G08B 13/1963* (2013.01); *G08B 13/19619* (2013.01); *G08B 13/19632* (2013.01)

(58) Field of Classification Search
CPC ............... G02B 15/173; G02B 9/34
USPC .................................... 359/676, 715
See application file for complete search history.

(56) References Cited

U.S. PATENT DOCUMENTS

2012/0194918 A1 * 8/2012 Yamaguchi .......... G02B 15/173
                                                                    359/687

FOREIGN PATENT DOCUMENTS

JP    2012-032469 A    2/2012

* cited by examiner

*Primary Examiner* — James Jones
(74) *Attorney, Agent, or Firm* — Studebaker & Brackett PC

(57) ABSTRACT

The zoom lens consists of, in order from the object side, a first lens group that has positive refractive power, a second lens group that has a negative refractive power, a third lens group that has a positive refractive power, a stop, and a fourth lens group that has a positive refractive power. During zooming, the second lens group and the third lens group move, and the other lens groups and the stop remain stationary. The second lens group consists of, in order from the object side, a second A lens group that has a cemented lens at a position closest to the image side, consists of three or less lenses, and has a negative refractive power, a second B lens group that consists of one or more negative single lenses, and a second C lens group that consists of a cemented lens and has a negative refractive power.

20 Claims, 11 Drawing Sheets

FIG. 1
EXAMPLE 1
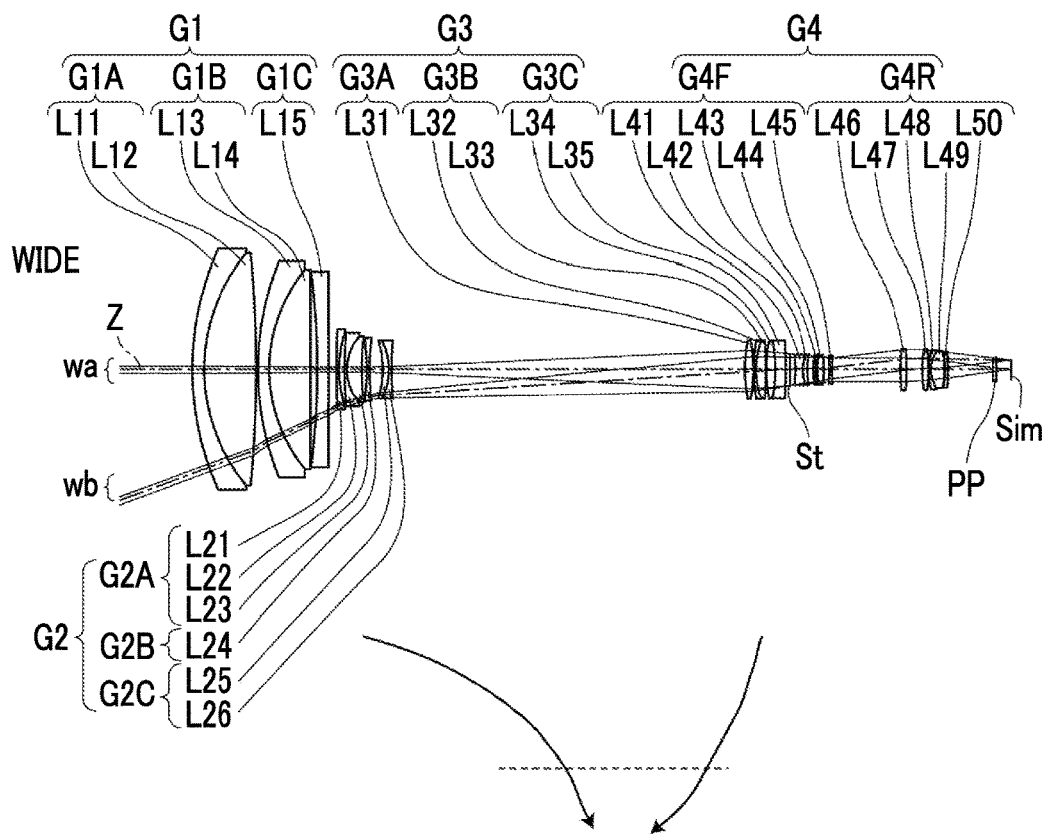
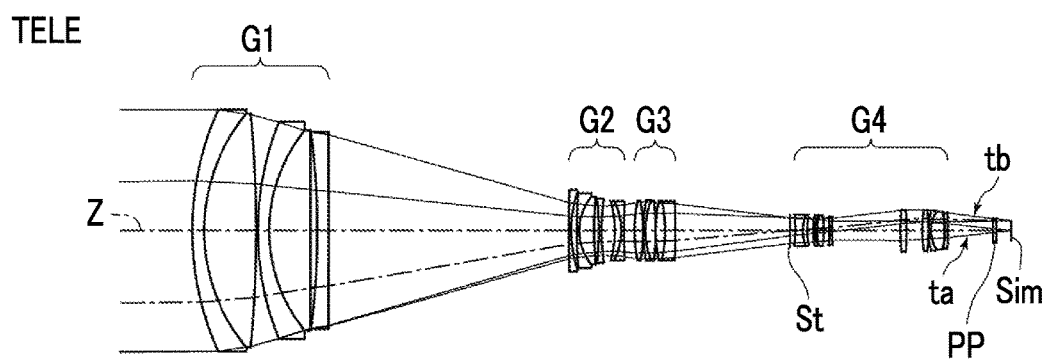

FIG. 2
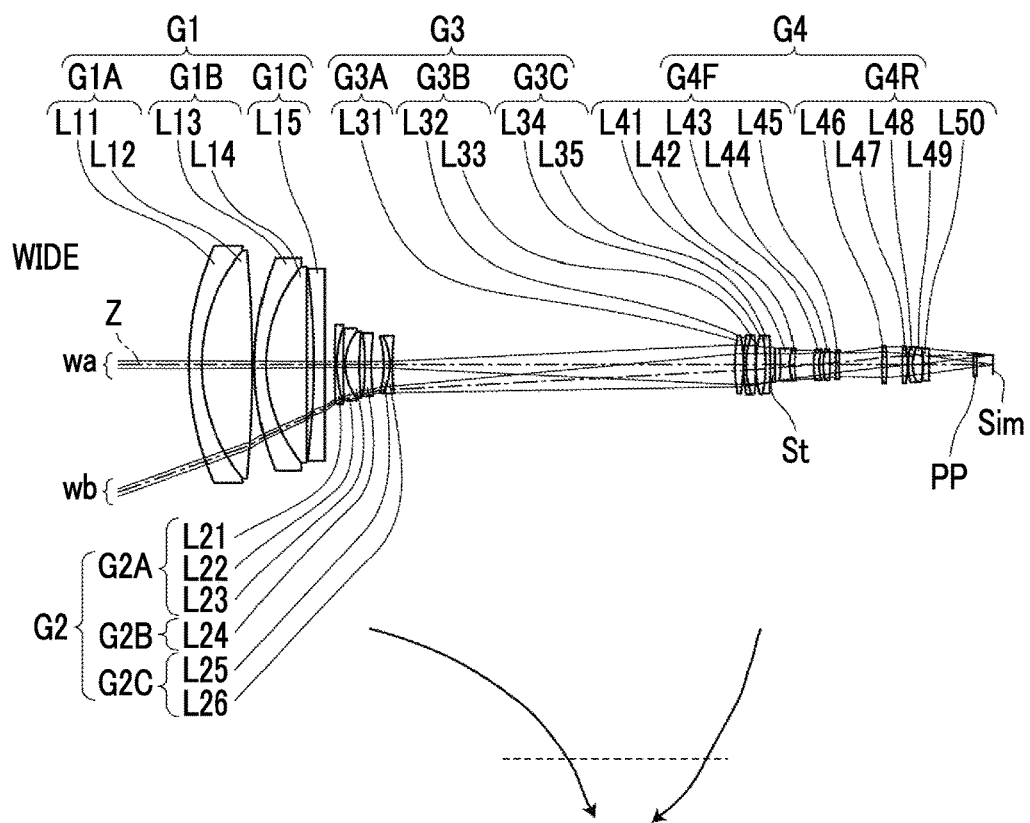
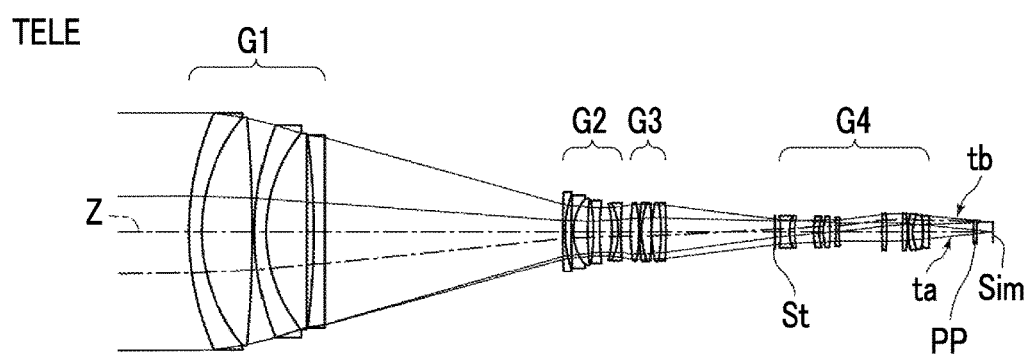

FIG. 3
EXAMPLE 3
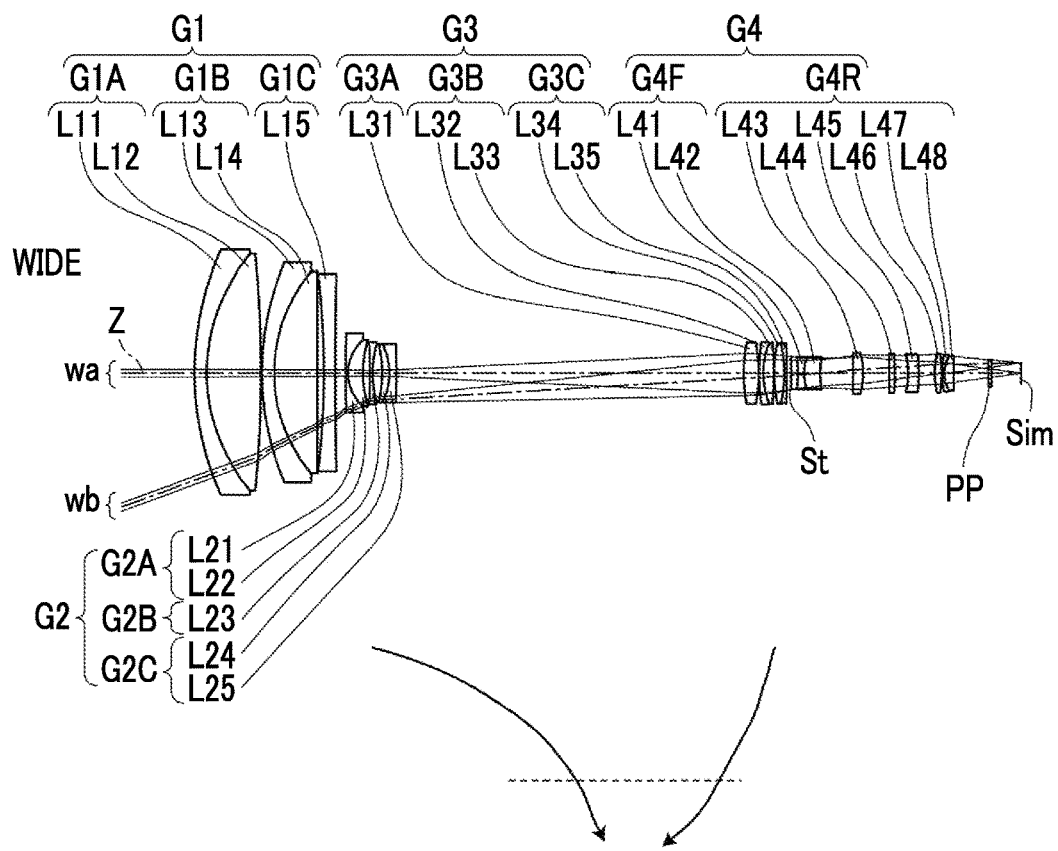
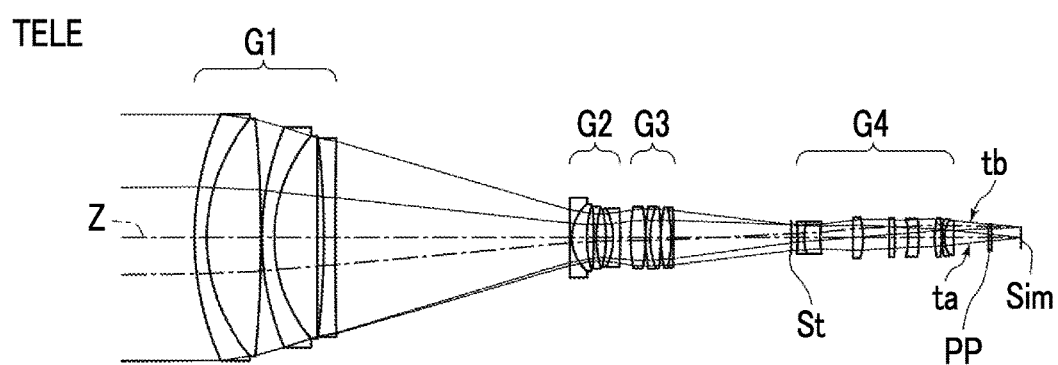

FIG. 4
EXAMPLE 4
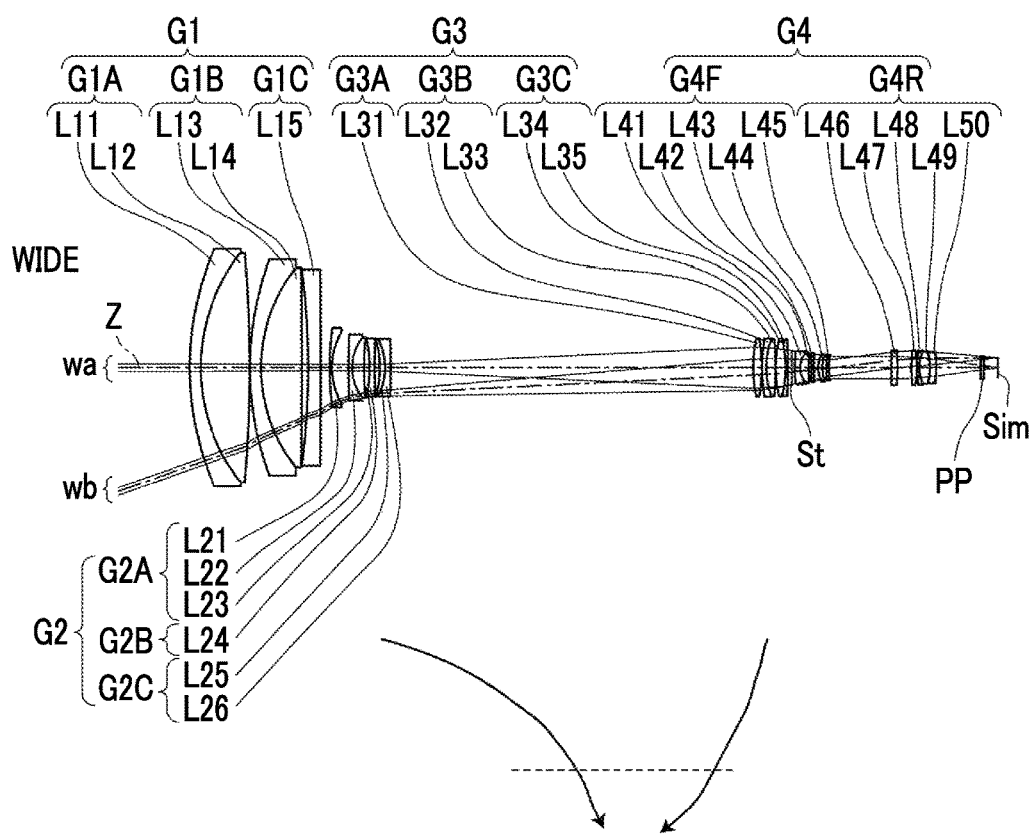
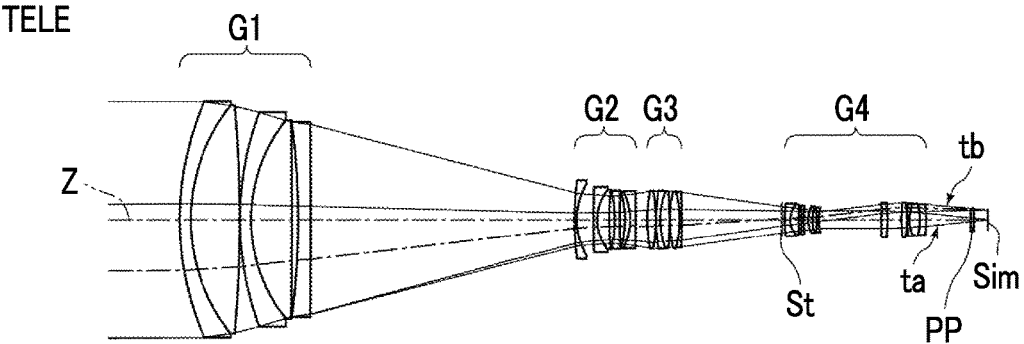

FIG. 5
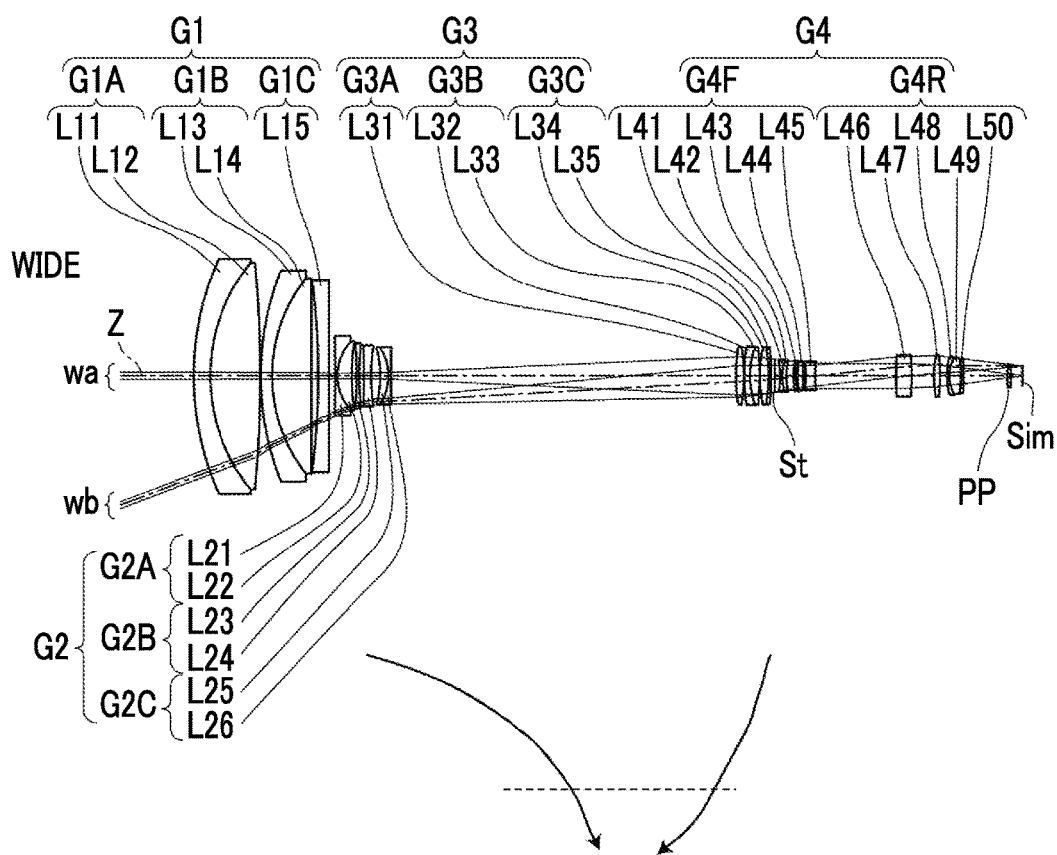
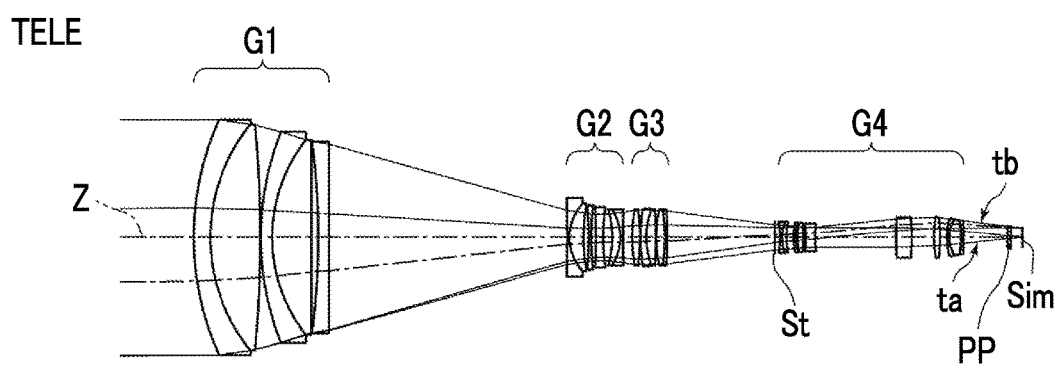

ZOOM LENS AND IMAGING DEVICE

CROSS-REFERENCE TO RELATED APPLICATIONS

The present application claims priority under 35 U.S.C. § 119 to Japanese Patent Application No. 2017-033131, filed on Feb. 24, 2017. The above application is hereby expressly incorporated by reference, in its entirety, into the present application.

BACKGROUND OF THE INVENTION

1. Field of the Invention

The present invention relates to a zoom lens and an imaging apparatus. In particular, the present invention relates to a zoom lens, which is appropriate for a long-distance surveillance camera, and an imaging apparatus comprising the zoom lens.

2. Description of the Related Art

In the related art, zoom lenses having a high zoom ratio are used as an optical system for surveillance cameras used for remote monitoring in harbors, airports, and the like. As such a zoom lens, for example, a zoom lens described in JP2012-32469A is known. JP2012-32469A discloses a zoom lens that is a lens system comprising four lens groups of a first lens group to a fourth lens group in order from the object side, a second lens group and a third lens group among the lens groups are moved to perform zooming, where the first lens group and the second lens group have cemented lenses.

SUMMARY OF THE INVENTION

In recent years, a zoom lens for application in distance monitoring is required to have high performance so as to cope with an increase in number of pixels of an imaging element while having a high zoom ratio capable of zooming up to a long focal length. Further, in the above-mentioned application, there is a demand for a zoom lens that maintains high optical performance in a wide wavelength range from the visible region to the near-infrared region so as to be able to perform imaging even at nighttime, in a dense fog, or the like. However, in a case where the focal length of the zoom lens is increased, the amount of occurrence of chromatic aberration increases. Thus, in a zoom lens having a long focal length, correction of chromatic aberration becomes a major problem.

For example, in a zoom lens such as the lens system disclosed in JP2012-32469A, in a case where the longitudinal chromatic aberration and the lateral chromatic aberration at the telephoto end are intended to be satisfactorily corrected, the absolute values of the radii of curvature of the cemented surfaces of the cemented lenses of the first lens group and the second lens group decreases. As a result, lateral chromatic aberration suddenly occurs at the wide-angle end. In order to sufficiently respond to recent demands for high performance which becomes stronger year by year, it is desired to further improve the correction of chromatic aberration for the zoom lens described in JP2012-32469A.

The present invention has been made in consideration of the above-mentioned situation, and its object is to provide a zoom lens, which maintains high optical performance since chromatic aberration is satisfactorily corrected in a wide wavelength range from a visible region to a near-infrared region while having a high zoom ratio, and an imaging apparatus comprising the zoom lens.

A zoom lens of the present invention consists of, in order from an object side: a first lens group that has a positive refractive power; a second lens group that has a negative refractive power; a third lens group that has a positive refractive power; a stop; and a fourth lens group that has a positive refractive power. During zooming from a wide-angle end to a telephoto end, the first lens group, the stop, and the fourth lens group remain stationary with respect to an image plane, and the second lens group moves toward an image side along an optical axis, and the third lens group moves toward the object side along the optical axis. The second lens group consists of, in order from the object side, a second A lens group that has a negative refractive power, a second B lens group that has a negative refractive power, and a second C lens group that has a negative refractive power. The second A lens group has a cemented lens, which is formed by cementing a negative lens and a positive lens in order from the object side, at a position closest to the image side, and consists of three or less lenses. Each of all lenses included in the second B lens group is a single lens having a negative refractive power. The second C lens group consists of a cemented lens which is formed by cementing a positive lens and a negative lens in order from the object side. In addition, it is preferable that assuming that a focal length of the second lens group is f2 and a focal length of the second B lens group is f2B, Conditional Expression (1) is satisfied.

$$0.01 < f2/f2B < 1 \quad (1)$$

It is preferable that the zoom lens of the present invention satisfies Conditional Expression (1-1).

$$0.1 < f2/f2B < 0.7 \quad (1\text{-}1)$$

In the zoom lens of the present invention, it is preferable that a cemented surface of the cemented lens of the second A lens group is convex toward the object side, and a cemented surface of the cemented lens of the second C lens group is convex toward the image side.

In the zoom lens of the present invention, it is preferable that during zooming from the wide-angle end to the telephoto end, the second lens group and the third lens group simultaneously pass points at which respective lateral magnifications thereof are −1 times.

In the zoom lens of the present invention, assuming that a focal length of the whole system at the telephoto end is fT and the focal length of the second lens group is f2, it is preferable that Conditional Expression (2) is satisfied, and it is more preferable that Conditional Expression (2-1) is satisfied.

$$-40 < fT/f2 < -10 \quad (2)$$

$$-30 < fT/f2 < -15 \quad (2\text{-}1)$$

In the zoom lens of the present invention, assuming that a focal length of the whole system at the telephoto end is fT and a focal length of the third lens group is f3, it is preferable that Conditional Expression (3) is satisfied, and it is more preferable that Conditional Expression (3-1) is satisfied.

$$5 < fT/f3 < 30 \quad (3)$$

$$7 < fT/f3 < 15 \quad (3\text{-}1)$$

In the zoom lens of the present invention, it is preferable that the third lens group consists of, in order from the object side, a third A lens group consisting of one positive lens, a third B lens group consisting of a cemented lens that is formed by cementing a negative meniscus lens, which is convex toward the object side, and a positive lens in order from the object side, and a third C lens group consisting of a cemented lens that is formed by cementing a positive lens, which is convex toward the image side, and a negative lens in order from the object side. In this case, assuming that a partial dispersion ratio of the positive lens of the third C lens group between a g line and an F line is θgFL34 and a partial dispersion ratio of the negative lens of the third C lens group between the g line and the F line is θgFL35, it is preferable that Conditional Expression (4) is satisfied, and it is more preferable that Conditional Expression (4-1) is satisfied.

$$-0.02 < \theta gFL34 - \theta gFL35 < 0 \quad (4)$$

$$-0.01 < \theta gFL34 - \theta gFL35 < 0 \quad (4\text{-}1)$$

In the zoom lens of the present invention, it is preferable that the first lens group consists of, in order from the object side, a first A lens group consisting of a cemented lens that is formed by cementing a negative meniscus lens, which is convex toward the object side, and a positive lens in order from the object side and has a positive refractive power as a whole, a first B lens group consisting of a cemented lens that is formed by cementing a negative meniscus lens, which is convex toward the object side, and a positive lens in order from the object side and has a positive refractive power as a whole, and a first C lens group consisting of one negative lens.

In a case where the first lens group consists of the three lens groups, assuming that a partial dispersion ratio of the negative meniscus lens of the first A lens group between a g line and an F line is θgFL11 and a partial dispersion ratio of the positive lens of the first A lens group between the g line and the F line is θgFL12, it is preferable that Conditional Expression (5) is satisfied, and it is more preferable that Conditional Expression (5-1) is satisfied.

$$0 < \theta gFL12 - \theta gFL11 < 0.02 \quad (5)$$

$$0 < \theta gFL12 - \theta gFL11 < 0.01 \quad (5\text{-}1)$$

Further, in a case where the first lens group consists of the three lens groups, assuming that a refractive index of the negative meniscus lens of the first B lens group at a d line is NL13, a refractive index of the negative lens of the first C lens group at the d line is NL15, an Abbe number of the negative meniscus lens of the first A lens group at the d line is νL11, an Abbe number of the positive lens of the first A lens group at the d line is νL12, a focal length of the first A lens group is f1A, and a focal length of the first lens group is f1, it is preferable that at least one of Conditional Expressions (6) to (8) is satisfied.

$$1.55 < (NL13+NL15)/2 < 1.9 \quad (6)$$

$$5 < \nu L12 - \nu L11 < 40 \quad (7)$$

$$0.7 < f1A/f1 < 2 \quad (8)$$

In the zoom lens of the present invention, assuming that a focal length of the whole system at the telephoto end is fT and a focal length of the first lens group is f1, it is preferable that Conditional Expression (9) is satisfied.

$$1 < fT/f1 < 4 \quad (9)$$

In the zoom lens of the present invention, it is preferable that the fourth lens group consists of, in order from the object side, a front group and a rear group that is separated from the front group by a longest air gap on the optical axis in the fourth lens group. The rear group has, in order from the object side, a single lens that has a positive refractive power, and a cemented lens that is formed by cementing a positive lens and a negative meniscus lens, which is concave toward the image side, in order from the object side.

An imaging apparatus of the present invention comprises the zoom lens of the present invention.

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and/or a hand shaking correction mechanism.

In addition, the term "~ group that has a positive refractive power" means that the group has a positive refractive power as a whole. It is the same for the term "~ group that has a negative refractive power". The "group" is not necessarily composed of a plurality of lenses, but may be composed of only one lens. Reference signs of refractive powers of the groups, reference signs of refractive powers of the lenses, and surface shapes of the lenses are assumed as those in paraxial regions in a case where some lenses have aspheric surfaces. The "single lens" means that the lens consists of one lens which is not cemented. The "negative meniscus lens" is a meniscus lens that has a negative refractive power. All the conditional expressions are based on the d line (a wavelength of 587.6 nm (nanometers)) in a state where an object at infinity is in focus.

It should be noted that the partial dispersion ratio θgF between the g line and the F line of a certain lens is defined by θgF=(Ng−NF)/(NF−NC), where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

According to the present invention, the lens system consists of, in order from the object side, the first lens group that has a positive refractive power, the second lens group that has a negative refractive power, the third lens group that has a positive refractive power, the stop, and the fourth lens group that has a positive refractive power. During zooming, only the second lens group and the third lens group move. By setting a specific configuration of the second lens group, the zoom lens is set to satisfy predetermined conditional expressions. Thus, it is possible to provide a zoom lens, which maintains high optical performance since chromatic aberration is satisfactorily corrected in a range from a visible region to a near-infrared region while having a high zoom ratio, and an imaging apparatus which comprises the zoom lens.

BRIEF DESCRIPTION OF THE DRAWINGS

FIG. 1 is a cross-sectional view illustrating a configuration and an optical path of a zoom lens according to Example 1 of the present invention, where the upper part thereof shows the zoom lens in a wide-angle end state and the lower part thereof shows the zoom lens in a telephoto end state.

FIG. 2 is a cross-sectional view illustrating a configuration and an optical path of a zoom lens according to Example 2 of the present invention, where the upper part thereof shows the zoom lens in a wide-angle end state and the lower part thereof shows the zoom lens in a telephoto end state.

FIG. 3 is a cross-sectional view illustrating a configuration and an optical path of a zoom lens according to Example 3 of the present invention, where the upper part thereof shows the zoom lens in a wide-angle end state and the lower part thereof shows the zoom lens in a telephoto end state.

FIG. 4 is a cross-sectional view illustrating a configuration and an optical path of a zoom lens according to Example 4 of the present invention, where the upper part thereof shows the zoom lens in a wide-angle end state and the lower part thereof shows the zoom lens in a telephoto end state.

FIG. 5 is a cross-sectional view illustrating a configuration and an optical path of a zoom lens according to Example 5 of the present invention, where the upper part thereof shows the zoom lens in a wide-angle end state and the lower part thereof shows the zoom lens in a telephoto end state.

DESCRIPTION OF THE PREFERRED EMBODIMENTS

Figure 6:
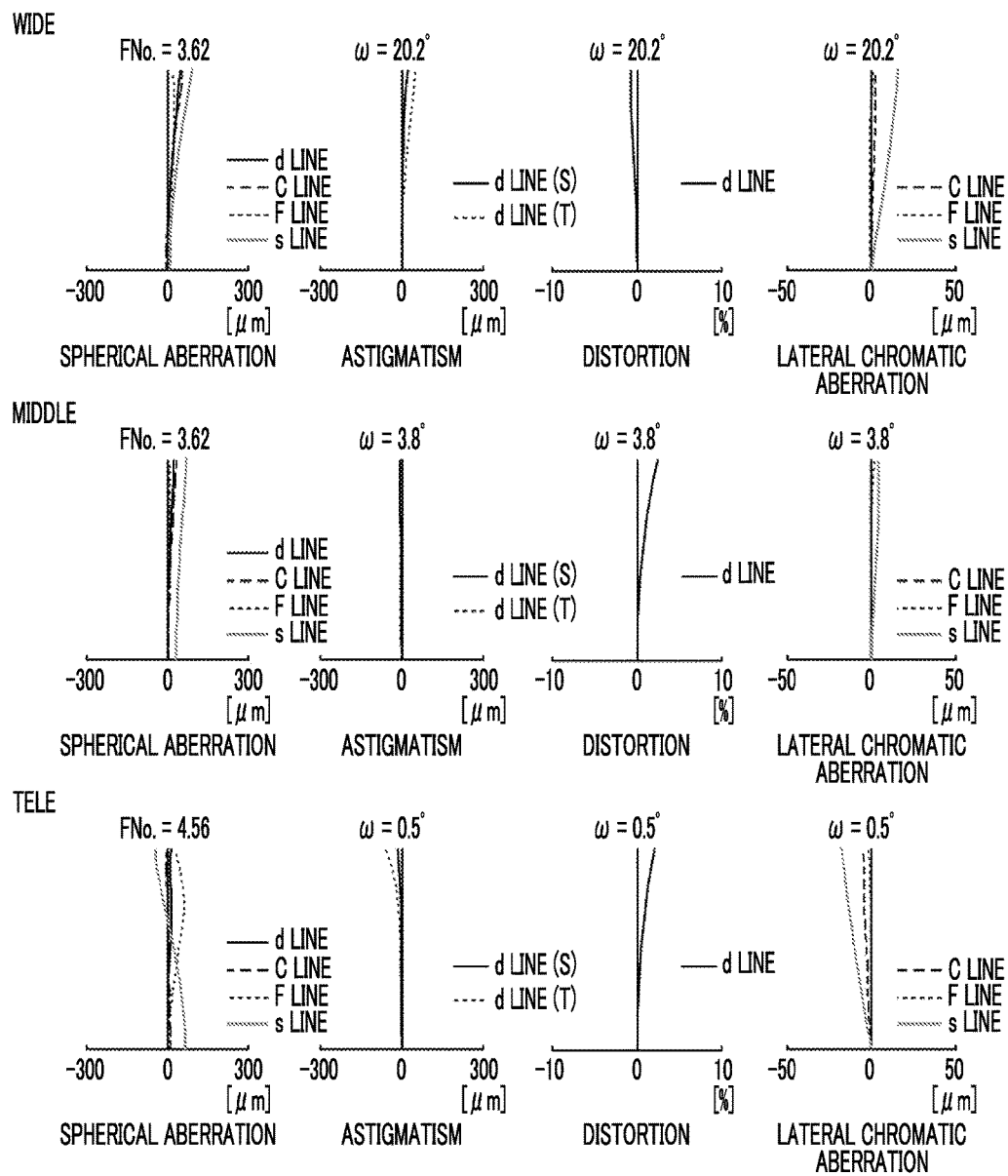
FIG. 6 is a diagram of aberrations of the zoom lens according to Example 1 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays to and rays with the maximum angle of view tb are shown as rays. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens consists of, in order from the object side to the image side along the optical axis Z: a first lens group G1 that has a positive refractive power; a second lens group G2 that has a negative refractive power; a third lens group G3 that has a positive refractive power; an aperture stop St; and a fourth lens group G4 that has a positive refractive power. It should be noted that the aperture stop St shown in FIG. 1 does not necessarily indicate its sizes and/or shapes, and indicates a position of the aperture stop St on the optical axis Z. During zooming from a wide-angle end to a telephoto end, the zoom lens is configured such that the first lens group G1, the aperture stop St, and the fourth lens group G4 remain stationary with respect to an image plane Sim, and the second lens group G2 moves toward an image side along an optical axis Z, and the third lens group G3 moves toward the object side along the optical axis Z. By setting the moving directions of the second lens group G2 and the third lens group G3 in the above-mentioned directions, the relative distance between the second lens group G2 and the third lens group G3 is constantly decreased during zooming from the wide-angle end to the telephoto end. Therefore, it is possible to perform zooming efficiently and the zoom lens is suitable for high zoom ratio. In FIG. 1, the respective schematic movement loci of the second lens group G2 and the third lens group G3 during zooming from the wide-angle end to the telephoto end are indicated by arrows between the upper part and the lower part thereof.

In this zoom lens, the rays raised once by the second lens group G2, which has a negative refractive power and is movable during zooming, are converged by the third lens group G3 having a positive refractive power. Thus, it is difficult to increase the size of the optical system. Generally, a lens system with a high zoom ratio tends to be large. However, considering application to imaging apparatuses such as surveillance cameras which need to consider restriction of installation space, cost increase due to strengthening of installation strength caused by an increase in weight resulting from an increase in size, and influence of strong wind in outdoor use, it is preferable that an increase in size of the lens system is suppressed as much as possible while maintaining a high zoom ratio. Among the high power zoom lenses having two lens groups movable during zooming, there is a type in which each of the two lens groups movable during zooming has a negative refractive power with another configuration different from that of the present embodiment. However, in this type, the rays are diverged in any of the two movable lens groups, and thus the optical system becomes large, which is a disadvantageous configuration for a high power zoom lens. On the other hand, according to the present embodiment, it is difficult to increase the size of the optical system, and a configuration of the optical system is suitable for a high power zoom lens that meets the market requirements.

Further, by making the fourth lens group G4, which is the subsequent group on the image side of the aperture stop St, as a lens group having a positive refractive power, the positive refractive power can be assigned to the third lens group G3 and the fourth lens group G4 with an appropriate proportion. Therefore, it is possible to appropriately set the positive refractive power of the third lens group G3. Thereby, it is possible to satisfactorily correct spherical aberration particularly in the middle zoom range from the wide-angle end.

In the zoom lens, it is preferable that, during zooming from the wide-angle end to the telephoto end, the second lens group G2 and the third lens group G3 simultaneously pass points at which respective lateral magnifications thereof are −1 times (an inverted equal magnification). In such a case, the third lens group G3 acts not only on the correction of the image plane Sim but also on the zooming itself, and thus the magnification is reduced on the wide-angle side on the basis of the position at which the magnification is −1 times, and the magnification is increased on the telephoto side. Therefore, the zoom ratio can be increased. In FIG. 1, a position, at which the respective lateral magnifications of the second lens group G2 and the third lens group G3 are −1 times at the same time, is indicated by the horizontal dotted line in the drawing of the movement locus.

The second lens group G2 of the zoom lens consists of, in order from the object side, three sub-lens groups including a second A lens group G2A having a negative refractive power, a second B lens group G2B having a negative refractive power, and a second C lens group G2C having a negative refractive power.

The second A lens group G2A is configured to have a cemented lens, which is formed by cementing a negative lens and a positive lens in order from the object side, at a position closest to the image side, and to consist of three or less lenses. This configuration is effective for correcting lateral chromatic aberration and distortion occurring on the wide-angle side. Further, setting the number of lenses of the second A lens group G2A to three or less contributes to suppression of the increase in size of the optical system.

All the lenses included in the second B lens group G2B are configured to be single lenses having negative refractive powers. The second B lens group G2B having such a configuration is disposed between the second A lens group G2A and the second C lens group G2C. With such a configuration, it is possible to strengthen the refractive power of the positive lens in the second lens group G2 without weakening the negative refractive power of the entire second lens group G2. As a result, it is possible to suppress fluctuation in lateral chromatic aberration caused by zooming.

The second C lens group G2C is configured to consist of a group of cemented lenses formed by cementing a positive lens and a negative lens in order from the object side. Thereby, it becomes easy to satisfactorily correct longitudinal chromatic aberration on the telephoto side.

Assuming a focal length of the second lens group G2 is f2 and a focal length of the second B lens group G2B is f2B, the zoom lens is configured to satisfy Conditional Expression (1). By not allowing the result of Conditional Expression (1) to be equal to or less than the lower limit, it is possible to prevent the refractive power of the second B lens group G2B, and it is possible to strengthen the refractive power of the positive lens in the second lens group G2. As a result, it is possible to suppress fluctuation in lateral chromatic aberration caused by zooming. By not allowing the result of Conditional Expression (1) to be equal to or greater than the upper limit, it is possible to suppress overcorrection of spherical aberration at the telephoto end caused by the increase in negative refractive power of the second B lens group G2B. Thereby, it becomes easy to decrease the F number at the telephoto end. In order to enhance the effect relating to Conditional Expression (1), it is more preferable that Conditional Expression (1-1) is satisfied.

$$0.01 < f2/f2B < 1 \tag{1}$$

$$0.1 < f2/f2B < 0.7 \tag{1-1}$$

It is preferable that the cemented surface of the cemented lens disposed closest to the image side in the second A lens group G2A is convex toward the object side. In such a case, it is possible to satisfactorily correct longitudinal chromatic aberration on the telephoto side while correcting lateral chromatic aberration which suddenly occurs as the image height increases on the wide-angle side.

It is preferable that the cemented surface of the cemented lens composing the second C lens group G2C is convex toward the image side. In this case, it is possible to satisfactorily correct longitudinal chromatic aberration on the telephoto side while correcting lateral chromatic aberration on the wide-angle side.

Assuming that a focal length of the whole system at the telephoto end is fT and the focal length of the second lens group G2 is f2, it is preferable that the zoom lens satisfies Conditional Expression (2). By not allowing the result of Conditional Expression (2) to be equal to or less than the lower limit, the negative refractive power of the second lens group G2 does not become excessively strong, and it is possible to prevent spherical aberration from being excessively corrected. Thereby, it is possible to appropriately correct spherical aberration mainly at the telephoto end. By not allowing the result of Conditional Expression (2) to be equal to or greater than the upper limit, it is possible to appropriately suppress an increase in movement distance of the second lens group G2 caused by zooming. As a result, the total length of the lens system can be set as an optimum length. In order to enhance the effect relating to Conditional Expression (2), it is more preferable that Conditional Expression (2-1) is satisfied.

$$-40 < fT/f2 < -10 \tag{2}$$

$$-30 < fT/f2 < -15 \tag{2-1}$$

Assuming that a focal length of the whole system at the telephoto end is fT and a focal length of the third lens group G3 is f3, it is preferable that the zoom lens satisfies Conditional Expression (3). By not allowing the result of Conditional Expression (3) to be equal to or less than the lower limit, it is possible to appropriately suppress an increase in movement distance of the third lens group G3 caused by zooming. As a result, the total length of the lens system can be set as an optimum length. By not allowing the result of Conditional Expression (3) to be equal to or greater than the upper limit, the positive refractive power of the third lens group G3 is not excessively increased, and it is possible to prevent spherical aberration correction from being insufficient. Thereby, it is possible to appropriately correct spherical aberration mainly at the wide-angle end. In order to enhance the effect relating to Conditional Expression (3), it is more preferable that Conditional Expression (3-1) is satisfied.

$$5 < fT/f3 < 30 \tag{3}$$

$$7 < fT/f3 < 15 \tag{3-1}$$

In a preferred aspect of the third lens group G3, the third lens group G3 consists of, in order from the object side, three sub-lens groups including a third A lens group G3A consisting of one positive lens, a third B lens group G3B consisting of a cemented lens that is formed by cementing a negative meniscus lens, which is convex toward the object side, and a positive lens in order from the object side, and a third C lens group G3C consisting of a cemented lens that is formed by cementing a positive lens, which is convex toward the image side, and a negative lens in order from the object side.

By adopting the above-mentioned configuration of the third A lens group G3A, the divergent light from the second lens group G2 can be guided to converge. As a result, it is possible to correct a difference caused by the wavelength of high-order spherical aberration occurring on the cemented surfaces of the two groups of cemented lenses arranged on the image side of the third A lens group G3A. Further, the third B lens group G3B consisting of the cemented lens of the above-mentioned configuration is disposed on the image side of the third A lens group G3A. With such a configuration, it is possible to correct longitudinal chromatic aberration occurring in the third A lens group G3A while satisfactorily correcting the difference in wavelength of high-order spherical aberration occurring on the cemented surfaces. Furthermore, the third C lens group G3C consisting of the cemented lens having the above construction is disposed on the image side of the third B lens group G3B. With such a configuration, it is possible to correct fluctuation in lateral chromatic aberration caused by zooming.

In a case of adopting the preferred aspect of the third lens group G3, assuming that a partial dispersion ratio of the positive lens of the third C lens group G3C between a g line and an F line is θgFL34 and a partial dispersion ratio of the negative lens of the third C lens group G3C between the g line and the F line is θgFL35, it is preferable that Conditional Expression (4) is satisfied. By satisfying Conditional Expression (4), it is possible to correct 2nd-order chromatic aberration occurring in the cemented lens of the third C lens group G3C, and it is possible to obtain favorable optical performance. In order to enhance the effect relating to Conditional Expression (4), it is more preferable that Conditional Expression (4-1) is satisfied.

$$-0.02 < \theta gFL34 - \theta gFL35 < 0 \tag{4}$$

$$-0.01 < \theta gFL34 - \theta gFL35 < 0 \tag{4-1}$$

In a preferred aspect of the first lens group G1, it is preferable that the first lens group G1 consists of, in order from the object side, a first A lens group G1A consisting of a cemented lens that is formed by cementing a negative meniscus lens, which is convex toward the object side, and a positive lens in order from the object side and has a positive refractive power as a whole, a first B lens group G1B consisting of a cemented lens that is formed by cementing a negative meniscus lens, which is convex toward the object side, and a positive lens in order from the object side and has a positive refractive power as a whole, and a first C lens group G1C consisting of one negative lens.

The two groups of cemented lenses having the above configuration and having positive refractive powers are arranged as a whole successively in order from the most object side. With such a configuration, there is an advantage in reducing spherical aberration and longitudinal chromatic aberration on the telephoto side. With the above-mentioned configuration, the lens surface of the first A lens group G1A closest to the object side becomes a convex surface, and there is an advantage in shortening the total length of the lens system. With the above-mentioned configuration, the cemented surface of the first A lens group G1A is convex toward the object side. Thereby, the difference in spherical aberration caused by wavelength is unlikely to occur, and high-order spherical aberration is unlikely to occur. Likewise, with the above-mentioned configuration, the lens surface of the first B lens group G1B closest to the object side becomes a convex surface. Thereby, there is an advantage in shortening the total length of the lens system and reducing spherical aberration. Further, with the above-mentioned configuration, the cemented surface of the first B lens group G1B is convex toward the object side. Thereby, a difference in spherical aberration caused by wavelength is unlikely to occur, and high-order spherical aberration is unlikely to occur. By adopting the above-mentioned configuration of the first C lens group G1C, there is an advantage in correction of spherical aberration at the telephoto end and correction of distortion at the wide-angle end.

In a case of adopting the preferred aspect of the first lens group G1, assuming that a partial dispersion ratio of the negative meniscus lens of the first A lens group G1A between a g line and an F line is θgFL11 and a partial dispersion ratio of the positive lens of the first A lens group G1A between the g line and the F line is θgFL12, it is preferable that Conditional Expression (5) is satisfied. By satisfying Conditional Expression (5), it is possible to correct 2nd-order chromatic aberration occurring in the cemented lens of the first A lens group G1A, and it is possible to obtain favorable optical performance. In order to enhance the effect relating to Conditional Expression (5), it is more preferable that Conditional Expression (5-1) is satisfied.

$$0 < \theta gFL12 - \theta gFL11 < 0.02 \tag{5}$$

$$0 < \theta gFL12 - \theta gFL11 < 0.01 \tag{5-1}$$

In the case of adopting the preferred aspect of the first lens group G1, assuming that a refractive index of the negative meniscus lens of the first B lens group G1B at a d line is NL13 and a refractive index of the negative lens of the first C lens group G1C at the d line is NL15, it is preferable that Conditional Expression (6) is satisfied. By not allowing the result of Conditional Expression (6) to be equal to or less than the lower limit, it is possible to suppress an increase in spherical aberration occurring in the negative meniscus lens of the first B lens group G1B and the negative lens of the first C lens group G1C. As a result, there is advantage in reducing insufficient correction of spherical aberration on the telephoto side. By not allowing the result of Conditional Expression (6) to be equal to or greater than the upper limit, there is an advantage in reducing overcorrection of spherical aberration on the telephoto side. In order to enhance the effect relating to Conditional Expression (6), it is more preferable that Conditional Expression (6-1) is satisfied.

$$1.55 < (NL13 + NL15)/2 < 1.9 \tag{6}$$

$$1.65 < (NL13 + NL15)/2 < 1.8 \tag{6-1}$$

In the case of adopting the preferred aspect of the first lens group G1, assuming that an Abbe number of the negative meniscus lens of the first A lens group G1A at the d line is vL11 and an Abbe number of the positive lens of the first A lens group G1A at the d line is vL12, it is preferable that Conditional Expression (7) is satisfied. By not allowing the result of Conditional Expression (7) to be equal to or less than the lower limit, an absolute value of a radius of curvature of the cemented surface is not reduced in order to correct the 1st-order longitudinal chromatic aberration. Thereby, it is possible to suppress a rapid increase in spherical aberration in the marginal region of the on-axis rays. By not allowing the result of Conditional Expression (7) to be equal to or greater than the upper limit, it is possible to satisfactorily correct 1st-order longitudinal chromatic aberration. In addition, considering that the negative meniscus lens and the positive lens, which compose the first A lens group G1A, are fabricated using an existing optical material, the difference in the partial dispersion ratio of these lenses does not become large, and it is possible to satisfactorily correct 2nd-order longitudinal chromatic aberration. In order to enhance the effect relating to Conditional Expression (7), it is more preferable that Conditional Expression (7-1) is satisfied.

$$5 < vL12 - vL11 < 40 \quad (7)$$

$$10 < vL12 - vL11 < 25 \quad (7\text{-}1)$$

In the case of adopting the preferred aspect of the first lens group G1, assuming that a focal length of the first A lens group G1A is f1A and a focal length of the first lens group G1 is f1, it is preferable that Conditional Expression (8) is satisfied. By not allowing the result of Conditional Expression (8) to be equal to or less than the lower limit, it is possible to suppress an increase in spherical aberration occurring in the first A lens group G1A, and it is possible to reduce insufficient correction of spherical aberration at the telephoto end. By not allowing the result of Conditional Expression (8) to be equal to or greater than the upper limit, it is possible for rays passing through the first A lens group G1A to be incident on the cemented surface of the first B lens group G1B at a favorable height. Therefore, it is possible to suppress an increase in longitudinal chromatic aberration occurring in the marginal region of the on-axis rays on the telephoto side. In order to enhance the effect relating to Conditional Expression (8), it is more preferable that Conditional Expression (8-1) is satisfied.

$$0.7 < f1A/f1 < 2 \quad (8)$$

$$0.9 < f1A/f1 < 1.3 \quad (8\text{-}1)$$

Regarding the first lens group G1, assuming that a focal length of the whole system at the telephoto end is fT and a focal length of the first lens group G1 is f1, it is preferable that Conditional Expression (9) is satisfied. By not allowing the result of Conditional Expression (9) to be equal to or less than the lower limit, it is possible to suppress an increase in total length of the lens system. By not allowing the result of Conditional Expression (9) to be equal to or greater than the upper limit, it is possible to appropriately maintain the positive refractive power of the first lens group G1. As a result, it is possible to suppress an increase in spherical aberration. In order to enhance the effect relating to Conditional Expression (9), it is more preferable that Conditional Expression (9-1) is satisfied.

$$1 < fT/f1 < 4 \quad (9)$$

$$1.5 < fT/f1 < 3 \quad (9\text{-}1)$$

The fourth lens group G4 may consist of, in order from the object side, two sub-lens groups of a front group G4F and a rear group G4R that is separated from the front group G4F by a longest air gap on the optical axis in the fourth lens group G4. In this case, it is preferable that the rear group G4R has, in order from the object side, a single lens that has a positive refractive power, and a cemented lens that is formed by cementing a positive lens and a negative meniscus lens, which is concave toward the image side, in order from the object side. In such a case, a single lens having a positive refractive power is disposed at a position on the image side distanced from the aperture stop St. Thereby, the on-axis rays can be converged, and the raised off-axis rays can be converged while being deflected in the direction of the optical axis. Further, it is possible to satisfactorily correct lateral chromatic aberration by the cemented lens of the positive lens and the negative meniscus lens, which is concave toward the image side, where the cemented lens is disposed on the image side of the single lens having a positive refractive power. Furthermore, in a case where the above-mentioned single lens having a positive refractive power and the above-mentioned cemented lens are successively arranged in the rear group G4R, it is possible to more satisfactorily correct lateral chromatic aberration.

It should be noted that the above-mentioned preferred configurations and available configurations may be arbitrary combinations, and it is preferable to selectively adopt the configurations in accordance with required specification. According to the present embodiment, it is possible to realize a zoom lens that maintains high optical performance by satisfactorily correcting chromatic aberration throughout a wide wavelength range from the visible region to the near-infrared region while having a high zoom ratio at which zooming up to a long focal length is possible. The term "long focal length" described herein means 300 mm or more, and the "high zoom ratio" means 30 times or more.

Next, numerical examples of the zoom lens of the present invention will be described.

EXAMPLE 1

A lens configuration of a zoom lens of Example 1 is shown in FIG. 1, and an illustration method thereof is as described above. Therefore, repeated description is partially omitted herein. The zoom lens of Example 1 consists of, in order from the object side, a first lens group G1 having a positive refractive power, a second lens group G2 having a negative refractive power, a third lens group G3 having a positive refractive power, an aperture stop St, and a fourth lens group G4 having a positive refractive power. During zooming from the wide-angle end to the telephoto end, the first lens group G1, the aperture stop St, and the fourth lens group G4 remain stationary with respect to the image plane Sim, the second lens group G2 moves to the image side, and the third lens group G3 moves to the object side.

The first lens group G1 consists of, in order from the object side, a first A lens group G1A, a first B lens group G1B, and a first C lens group G1C. The first A lens group G1A consists of two lenses L11 and L12 in order from the object side, the first B lens group G1B consists of two lenses L13 and L14, and the first C lens group G1C consists of one lens L15. The second lens group G2 consists of, in order from the object side, a second A lens group G2A, a second B lens group G2B, and a second C lens group G2C. The second A lens group G2A consists of three lenses L21 to L23 in order from the object side, the second B lens group G2B consists of one lens L24, and the second C lens group G2C consists of two lenses L25 and L26 in order from the object side. The third lens group G3 consists of, in order from the object side, a third A lens group G3A, a third-B lens group G3B, and a third C lens group G3C. The third A lens group G3A consists of one lens L31, the third B lens group G3B consists of two lenses L32 and L33, and the third C lens group G3C consists of two lenses L34 and L35. The fourth lens group G4 consists of, in order from the object side, a front group G4F and a rear group G4R. The front group G4F consists of five lenses L41 to L45 in order from the object side, and the rear group G4R consists of five lenses L46 to L50 in order from the object side.

Table 1 shows basic lens data of the zoom lens of Example 1, and Table 2 shows specification and variable surface distances. In Table 1, the column of Si shows i-th (i=1, 2, 3, . . . ) surface number. The i-th surface number is attached to each of surfaces of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side in a case where the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)).

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances are referenced by the reference signs DD[ ], and are written into places of Di, where object side surface numbers of distances are noted in [ ].

In Table 2, values of the zoom ratio Zr, the focal length f of the whole system, the back focal length Bf in terms of the air conversion distance, the F number FNo., the maximum total angle of view 2ω, and variable surface distance are based on the d line. (o) in the place of 2ω indicates that the unit thereof is a degree. In Table 2, values in the wide-angle end state, the middle focal length state, and the telephoto end state are respectively shown in the columns labeled by WIDE, MIDDLE, and TELE. The values of Tables 1 and 2 are values in a state where the object at the infinity is in focus.

In data of each table, a degree is used as a unit of an angle, and mm is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | 131.01891 | 5.250 | 1.51680 | 64.20 | 0.53430 |
| 2 | 80.23895 | 23.214 | 1.49700 | 81.54 | 0.53748 |
| 3 | −549.12904 | 0.850 | | | |
| 4 | 128.26070 | 5.018 | 1.72000 | 43.69 | 0.56995 |
| 5 | 70.39152 | 18.255 | 1.49700 | 81.54 | 0.53748 |
| 6 | ∞ | 3.006 | | | |
| 7 | −345.92913 | 5.000 | 1.78590 | 44.20 | 0.56317 |
| 8 | −15295.12488 | DD[8] | | | |
| 9 | 571.37563 | 1.000 | 1.71300 | 53.87 | 0.54587 |
| 10 | 53.49406 | 2.544 | | | |
| 11 | 235.62497 | 1.010 | 1.77250 | 49.60 | 0.55212 |
| 12 | 23.39106 | 6.541 | 1.80518 | 25.42 | 0.61616 |
| 13 | 129.75819 | 2.167 | | | |
| 14 | −109.41794 | 1.200 | 1.61800 | 63.33 | 0.54414 |
| 15 | 97.01064 | 5.845 | | | |
| 16 | −47.46381 | 2.776 | 1.79952 | 42.22 | 0.56727 |
| 17 | −29.31256 | 1.210 | 1.62299 | 58.16 | 0.54589 |
| 18 | 202.82601 | DD[18] | | | |
| 19 | 73.32901 | 3.714 | 1.43875 | 94.66 | 0.53402 |
| 20 | −76.72533 | 0.100 | | | |
| 21 | 72.42878 | 1.000 | 1.91082 | 35.25 | 0.58224 |
| 22 | 36.91887 | 4.404 | 1.49700 | 81.54 | 0.53748 |
| 23 | −154.17556 | 0.100 | | | |
| 24 | 63.38389 | 4.103 | 1.49700 | 81.54 | 0.53748 |
| 25 | −64.48369 | 4.554 | 1.71300 | 53.87 | 0.54587 |
| 26 | −250.68349 | DD[26] | | | |
| 27 (St) | ∞ | 2.379 | | | |
| 28 | −49.51062 | 3.580 | 1.51823 | 58.90 | 0.54567 |
| 29 | 20.55757 | 2.062 | 1.91082 | 35.25 | 0.58224 |
| 30 | 40.47700 | 2.672 | | | |
| 31 | 36.98893 | 1.000 | 1.51823 | 58.90 | 0.54567 |
| 32 | 22.01934 | 0.752 | | | |
| 33 | 34.99174 | 2.866 | 1.64769 | 33.79 | 0.59393 |
| 34 | −56.98495 | 2.470 | | | |
| 35 | −72.86629 | 1.017 | 2.00100 | 29.13 | 0.59952 |
| 36 | 46.73866 | 30.754 | | | |
| 37 | 131.09625 | 2.658 | 1.69895 | 30.13 | 0.60298 |
| 38 | −102.60004 | 6.918 | | | |
| 39 | 54.73906 | 2.723 | 1.59522 | 67.73 | 0.54426 |
| 40 | −87.10275 | 0.103 | | | |
| 41 | 38.76963 | 1.000 | 1.80400 | 46.58 | 0.55730 |
| 42 | 15.42468 | 6.005 | 1.49700 | 81.54 | 0.53748 |
| 43 | −41.95437 | 0.200 | | | |
| 44 | −46.04547 | 1.232 | 1.91082 | 35.25 | 0.58224 |
| 45 | −285.43763 | 20.000 | | | |
| 46 | ∞ | 1.500 | 1.51680 | 64.20 | 0.53430 |
| 47 | ∞ | 6.416 | | | |

TABLE 2

Example 1

| | WIDE | MIDDLE | TELE |
|---|---|---|---|
| Zr | 1.0 | 5.3 | 40.0 |
| f | 12.190 | 65.194 | 487.612 |
| Bf | 27.405 | 27.405 | 27.405 |
| FNo. | 3.62 | 3.62 | 4.56 |
| 2ω (°) | 40.4 | 7.6 | 1.0 |
| DD[8] | 3.546 | 74.883 | 106.072 |
| DD[18] | 155.974 | 70.934 | 4.734 |
| DD[26] | 1.889 | 15.592 | 50.603 |

FIG. 6 shows aberration diagrams in a state where an object at the infinity is brought into focus through the zoom lens of Example 1. In FIG. 6, in order from the left side, spherical aberration, astigmatism, distortion, and lateral chromatic aberration are shown. In FIG. 6, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the s line (a wavelength of 852.1 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the s line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

EXAMPLE 2

Figure 7:
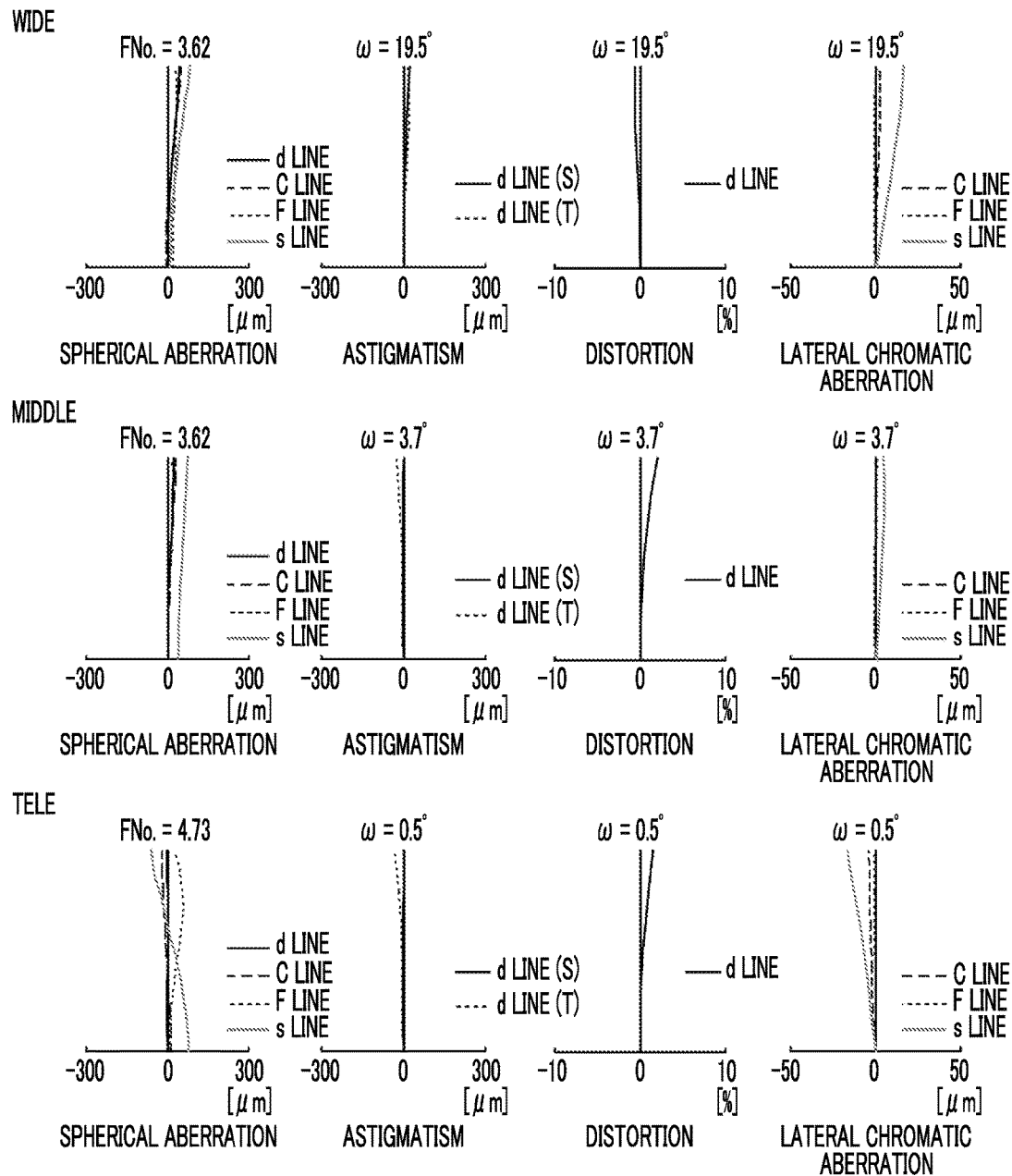
FIG. 7 is a diagram of aberrations of the zoom lens according to Example 2 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 2 shows a lens configuration and an optical path of a zoom lens of Example 2. A group configuration of a zoom lens of Example 2, the sign of the refractive power of each lens group, the lens group moving during zooming and the direction of movement thereof, and the number of lenses composing each lens group are the same as those of Example 1. Table 3 shows basic lens data of the zoom lens of Example 2, Table 4 shows specification and variable surface distances, and FIG. 7 shows aberration diagrams in a state where the object at the infinity is in focus.

TABLE 3

Example 2

| Si | Ri | Di | Ndj | vdj | θgFj |
|---|---|---|---|---|---|
| 1 | 131.82945 | 5.818 | 1.51680 | 64.20 | 0.53430 |
| 2 | 80.92297 | 22.933 | 1.49700 | 81.54 | 0.53748 |
| 3 | −563.26176 | 0.930 | | | |
| 4 | 129.63439 | 5.010 | 1.72000 | 43.69 | 0.56995 |
| 5 | 70.89036 | 18.205 | 1.49700 | 81.54 | 0.53748 |
| 6 | ∞ | 3.151 | | | |
| 7 | −347.30926 | 5.000 | 1.78590 | 44.20 | 0.56317 |
| 8 | −11808.64503 | DD[8] | | | |
| 9 | 427.60196 | 1.000 | 1.71300 | 53.87 | 0.54587 |
| 10 | 50.12136 | 2.763 | | | |
| 11 | 225.92877 | 1.010 | 1.77250 | 49.60 | 0.55212 |
| 12 | 23.70911 | 6.440 | 1.80518 | 25.42 | 0.61616 |
| 13 | 142.32273 | 2.529 | | | |
| 14 | −102.18143 | 2.824 | 1.61800 | 63.33 | 0.54414 |
| 15 | 108.97232 | 5.595 | | | |
| 16 | −47.21663 | 2.766 | 1.79952 | 42.22 | 0.56727 |
| 17 | −29.04073 | 1.210 | 1.62299 | 58.16 | 0.54589 |
| 18 | 184.94702 | DD[18] | | | |
| 19 | 76.11815 | 3.799 | 1.43875 | 94.66 | 0.53402 |
| 20 | −71.99333 | 0.100 | | | |
| 21 | 75.69829 | 1.089 | 1.91082 | 35.25 | 0.58224 |
| 22 | 36.68941 | 4.382 | 1.49700 | 81.54 | 0.53748 |
| 23 | −178.96354 | 0.100 | | | |
| 24 | 54.86769 | 4.254 | 1.49700 | 81.54 | 0.53748 |
| 25 | −73.43279 | 2.171 | 1.71300 | 53.87 | 0.54587 |
| 26 | −271.64341 | DD[26] | | | |
| 27 (St) | ∞ | 2.510 | | | |
| 28 | −50.41133 | 3.983 | 1.51823 | 58.90 | 0.54567 |
| 29 | 20.01260 | 2.148 | 1.91082 | 35.25 | 0.58224 |
| 30 | 34.23856 | 8.719 | | | |
| 31 | 40.01928 | 2.387 | 1.51742 | 52.43 | 0.55649 |

TABLE 3-continued

Example 2

| Si | Ri | Di | Ndj | vdj | θgFj |
|---|---|---|---|---|---|
| 32 | 22.70464 | 1.976 | | | |
| 33 | 32.54405 | 2.945 | 1.64769 | 33.79 | 0.59393 |
| 34 | −65.00724 | 2.576 | | | |
| 35 | −94.60046 | 1.398 | 2.00100 | 29.13 | 0.59952 |
| 36 | 42.46595 | 19.852 | | | |
| 37 | 190.17379 | 2.134 | 1.69895 | 30.13 | 0.60298 |
| 38 | −76.19387 | 6.940 | | | |
| 39 | 130.15933 | 2.313 | 1.59522 | 67.73 | 0.54426 |
| 40 | −59.00926 | 0.418 | | | |
| 41 | 34.86461 | 1.975 | 1.80400 | 46.58 | 0.55730 |
| 42 | 18.10286 | 4.501 | 1.49700 | 81.54 | 0.53748 |
| 43 | −44.40582 | 0.203 | | | |
| 44 | −49.10061 | 2.637 | 1.91082 | 35.25 | 0.58224 |
| 45 | −9535.08815 | 20.000 | | | |
| 46 | ∞ | 1.500 | 1.51680 | 64.20 | 0.53430 |
| 47 | ∞ | 7.279 | | | |

TABLE 4

Example 2

| | WIDE | MIDDLE | TELE |
|---|---|---|---|
| Zr | 1.0 | 5.3 | 40.0 |
| f | 12.651 | 67.660 | 506.058 |
| Bf | 28.268 | 28.268 | 28.268 |
| FNo. | 3.62 | 3.62 | 4.73 |
| 2ω (°) | 39.0 | 7.4 | 1.0 |
| DD[8] | 4.387 | 75.998 | 107.417 |
| DD[18] | 154.357 | 69.544 | 4.279 |
| DD[26] | 2.111 | 15.313 | 49.160 |

EXAMPLE 3

Figure 8:
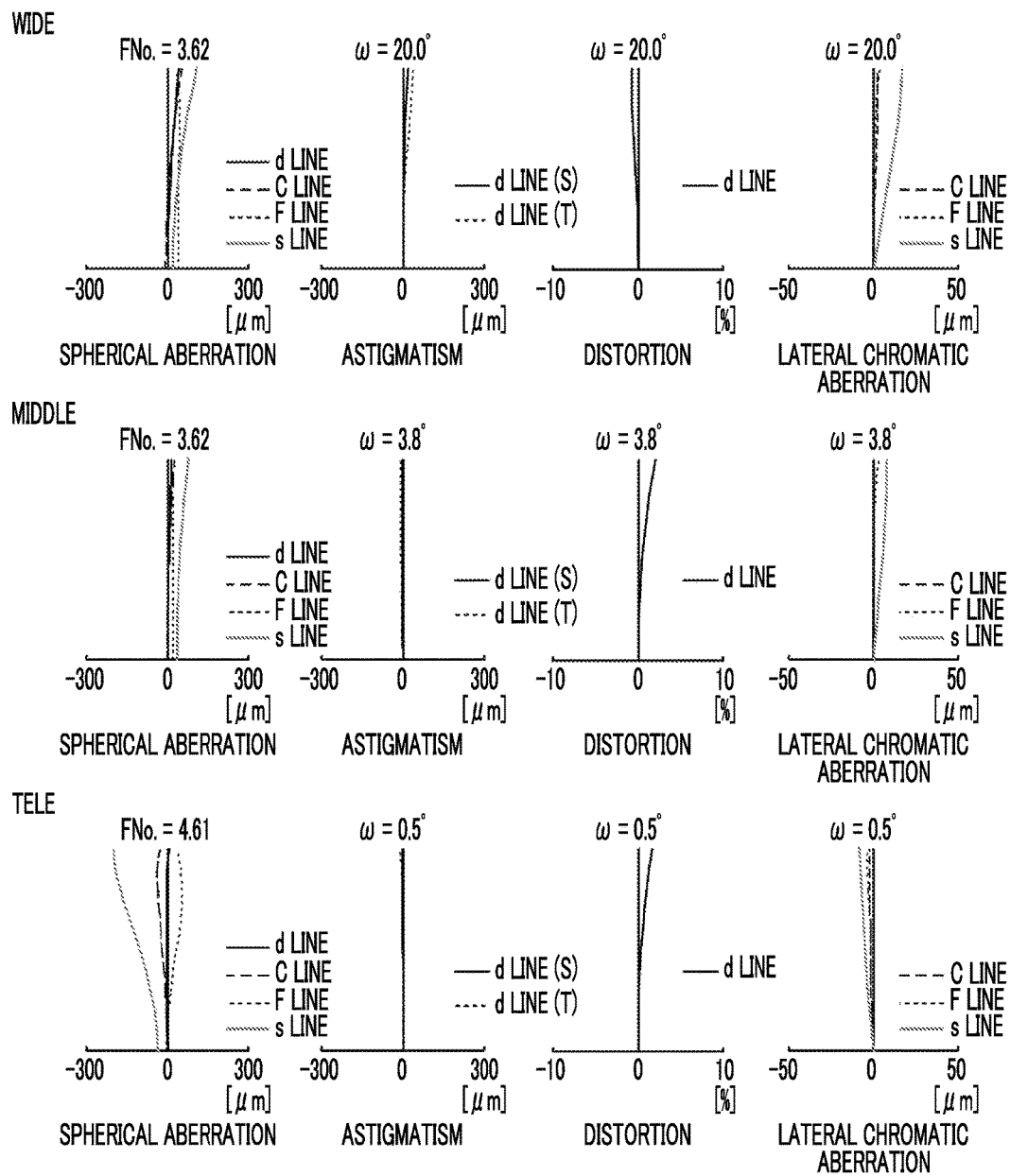
FIG. 8 is a diagram of aberrations of the zoom lens according to Example 3 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 3 shows a lens configuration and an optical path of a zoom lens of Example 3. The zoom lens of Example 3 is the same as that of Example 1 in terms of: the group configuration; the sign of the refractive powers of the respective lens groups; the lens groups that move during zooming; and the movement directions thereof. In the zoom lens of Example 3, the second A lens group G2A consists of two lenses L21 and L22 in order from the object side, the second B lens group G2B consists of one lens L23, the second C lens group G2C consists of two lenses L24 and L25 in order from the object side, the front group G4F consists of two lenses L41 and L42 in order from the object side, the rear group G4R consists of six lenses L43 to L48 in order from the object side. The number of lenses composing each of the other lens groups of the zoom lens of Example 3 is the same as that of Example 1. Table 5 shows basic lens data of the zoom lens of Example 3, Table 6 shows specification and variable surface distances, and FIG. 8 shows aberration diagrams in a state where the object at the infinity is in focus.

TABLE 5

Example 3

| Si | Ri | Di | Ndj | vdj | θgFj |
|---|---|---|---|---|---|
| 1 | 130.45206 | 5.323 | 1.51680 | 64.20 | 0.53430 |
| 2 | 79.58831 | 23.767 | 1.49700 | 81.54 | 0.53748 |
| 3 | −537.92082 | 0.430 | | | |
| 4 | 122.02100 | 5.334 | 1.70154 | 41.24 | 0.57664 |
| 5 | 68.68959 | 18.714 | 1.49700 | 81.54 | 0.53748 |

TABLE 5-continued

Example 3

| Si | Ri | Di | Ndj | vdj | θgFj |
|---|---|---|---|---|---|
| 6 | 26368.39073 | 2.850 | | | |
| 7 | −378.67973 | 5.000 | 1.78590 | 44.20 | 0.56317 |
| 8 | 2286.86426 | DD[8] | | | |
| 9 | 962.03985 | 1.010 | 1.74320 | 49.34 | 0.55312 |
| 10 | 19.42413 | 6.448 | 1.80518 | 25.42 | 0.61616 |
| 11 | 47.93096 | 3.028 | | | |
| 12 | −219.91624 | 1.200 | 1.77250 | 49.60 | 0.55212 |
| 13 | 49.09829 | 4.076 | | | |
| 14 | −50.79197 | 3.123 | 1.80518 | 25.42 | 0.61616 |
| 15 | −28.20582 | 3.033 | 1.77250 | 49.60 | 0.55212 |
| 16 | −314.62397 | DD[16] | | | |
| 17 | 71.68965 | 6.480 | 1.43875 | 94.66 | 0.53402 |
| 18 | −73.12048 | 0.100 | | | |
| 19 | 78.99175 | 1.908 | 1.80100 | 34.97 | 0.58642 |
| 20 | 36.41930 | 4.565 | 1.49700 | 81.54 | 0.53748 |
| 21 | −138.49475 | 0.100 | | | |
| 22 | 60.79088 | 4.412 | 1.49700 | 81.54 | 0.53748 |
| 23 | −57.20449 | 1.000 | 1.69680 | 55.53 | 0.54341 |
| 24 | −417.98626 | DD[24] | | | |
| 25 (St) | ∞ | 2.921 | | | |
| 26 | −42.61473 | 2.654 | 1.63139 | 59.93 | 0.54220 |
| 27 | 21.78008 | 7.395 | 1.67300 | 38.15 | 0.57545 |
| 28 | 42.39932 | 14.257 | | | |
| 29 | −1288.39688 | 4.367 | 1.51633 | 64.14 | 0.53531 |
| 30 | −30.47430 | 11.223 | | | |
| 31 | 2213.99644 | 2.521 | 1.49700 | 81.54 | 0.53748 |
| 32 | −111.15843 | 6.131 | | | |
| 33 | −29.97297 | 4.465 | 1.49700 | 81.54 | 0.53748 |
| 34 | −87.40361 | 6.997 | | | |
| 35 | 38.41224 | 2.950 | 1.60342 | 38.03 | 0.58356 |
| 36 | −65.75061 | 0.166 | | | |
| 37 | 38.64831 | 1.000 | 1.80100 | 34.97 | 0.58642 |
| 38 | 14.27395 | 3.995 | 1.43875 | 94.66 | 0.53402 |
| 39 | 134.85299 | 15.000 | | | |
| 40 | ∞ | 1.500 | 1.51680 | 64.20 | 0.53430 |
| 41 | ∞ | 12.790 | | | |

TABLE 6

Example 3

| | WIDE | MIDDLE | TELE |
|---|---|---|---|
| Zr | 1.0 | 5.3 | 40.0 |
| f | 12.321 | 65.893 | 492.842 |
| Bf | 28.779 | 28.779 | 28.779 |
| FNo. | 3.62 | 3.62 | 4.61 |
| 2ω (°) | 40.0 | 7.6 | 1.0 |
| DD[8] | 4.505 | 72.110 | 101.470 |
| DD[16] | 150.499 | 69.023 | 4.483 |
| DD[24] | 1.980 | 15.850 | 51.030 |

EXAMPLE 4

Figure 9:
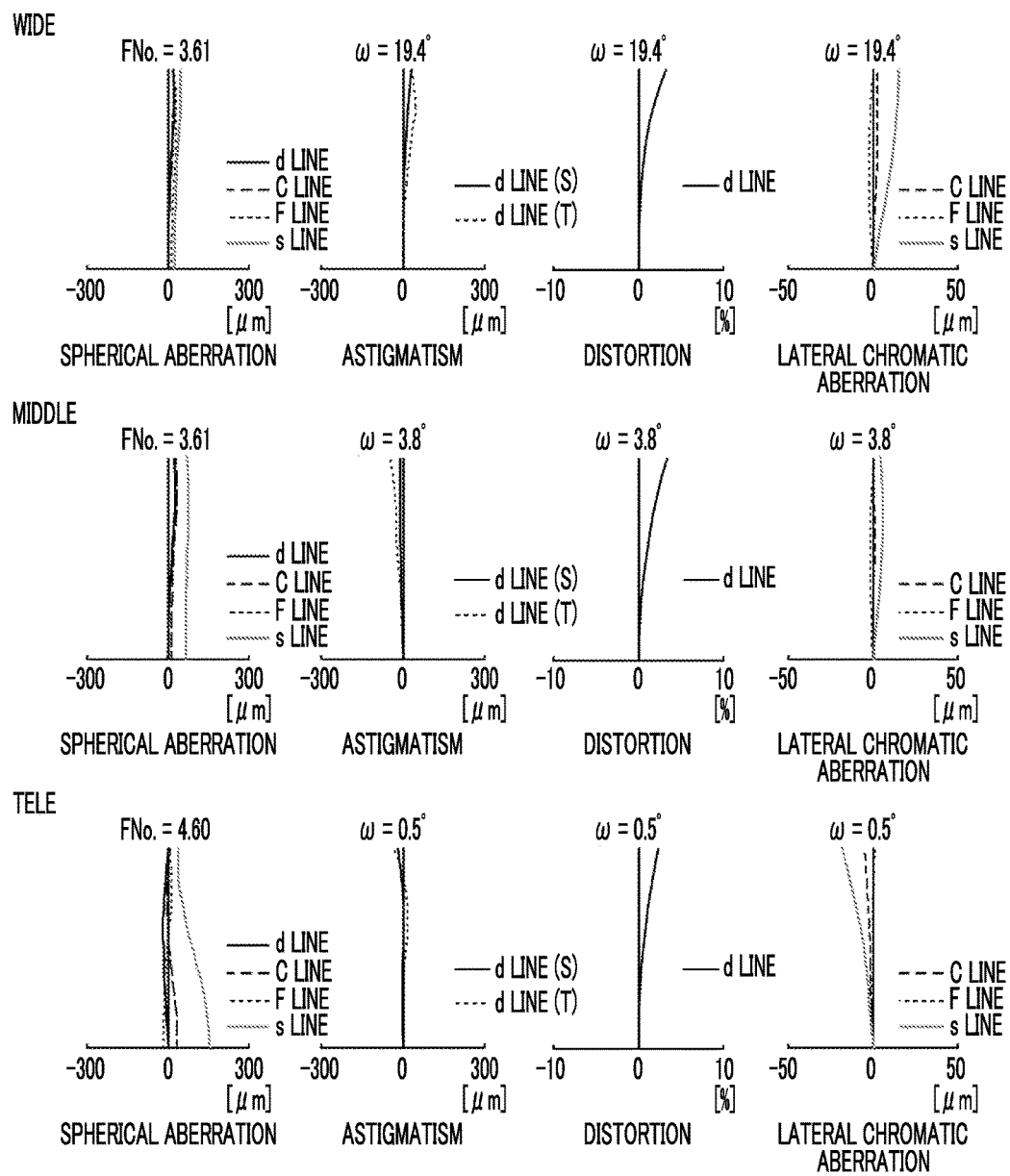
FIG. 9 is a diagram of aberrations of the zoom lens according to Example 4 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 4 shows a lens configuration and an optical path of a zoom lens of Example 4. A group configuration of a zoom lens of Example 4, the sign of the refractive power of each lens group, the lens group moving during zooming and the direction of movement thereof, and the number of lenses composing each lens group are the same as those of Example 1. Table 7 shows basic lens data of the zoom lens of Example 4, Table 8 shows specification and variable surface distances, and FIG. 9 shows aberration diagrams in a state where the object at the infinity is in focus.

TABLE 7

Example 4

| Si | Ri | Di | Ndj | vdj | θgFj |
|---|---|---|---|---|---|
| 1 | 133.14176 | 5.030 | 1.51680 | 64.20 | 0.53430 |
| 2 | 82.49125 | 22.250 | 1.49700 | 81.54 | 0.53748 |
| 3 | −601.06843 | 0.100 | | | |
| 4 | 139.37201 | 5.000 | 1.71700 | 47.93 | 0.56062 |
| 5 | 72.44122 | 18.305 | 1.49700 | 81.54 | 0.53748 |
| 6 | −4113.43573 | 2.867 | | | |
| 7 | −344.19520 | 5.665 | 1.81600 | 46.62 | 0.55682 |
| 8 | −6341.28452 | DD[8] | | | |
| 9 | 134.17545 | 1.007 | 1.62041 | 60.29 | 0.54266 |
| 10 | 31.89209 | 7.556 | | | |
| 11 | 417.84153 | 1.640 | 1.69680 | 55.53 | 0.54341 |
| 12 | 21.91563 | 5.436 | 1.69895 | 30.13 | 0.60298 |
| 13 | 141.64978 | 2.459 | | | |
| 14 | −64.69850 | 2.242 | 1.62299 | 58.16 | 0.54589 |
| 15 | 586.93953 | 2.380 | | | |
| 16 | −43.13222 | 2.351 | 1.90043 | 37.37 | 0.57720 |
| 17 | −28.11140 | 2.474 | 1.59522 | 67.73 | 0.54426 |
| 18 | −1444.04878 | DD[18] | | | |
| 19 | 66.50698 | 3.857 | 1.49700 | 81.54 | 0.53748 |
| 20 | −75.36381 | 0.100 | | | |
| 21 | 81.76415 | 1.888 | 1.91082 | 35.25 | 0.58224 |
| 22 | 36.69615 | 4.171 | 1.49700 | 81.54 | 0.53748 |
| 23 | −161.90785 | 0.100 | | | |
| 24 | 53.68571 | 4.461 | 1.49700 | 81.54 | 0.53748 |
| 25 | −51.99910 | 1.000 | 1.72916 | 54.68 | 0.54451 |
| 26 | −271.59205 | DD[26] | | | |
| 27 (St) | ∞ | 1.526 | | | |
| 28 | 74.90521 | 2.411 | 1.69680 | 55.53 | 0.54341 |
| 29 | 10.26136 | 3.929 | 1.72047 | 34.71 | 0.58350 |
| 30 | 395.98956 | 1.110 | | | |
| 31 | −118.47524 | 1.090 | 2.00100 | 29.13 | 0.59952 |
| 32 | 83.32558 | 2.009 | | | |
| 33 | 13.13021 | 1.878 | 1.43875 | 94.66 | 0.53402 |
| 34 | 18.33754 | 1.948 | | | |
| 35 | −262.45194 | 1.000 | 2.00100 | 29.13 | 0.59952 |
| 36 | 29.26778 | 28.486 | | | |
| 37 | 5156.76161 | 2.662 | 1.84666 | 23.78 | 0.62054 |
| 38 | −98.39780 | 6.318 | | | |
| 39 | 93.63216 | 2.483 | 1.67300 | 38.15 | 0.57545 |
| 40 | −51.19149 | 0.100 | | | |
| 41 | 66.82301 | 1.010 | 1.54072 | 47.23 | 0.56511 |
| 42 | 17.58742 | 4.585 | 1.49700 | 81.54 | 0.53748 |
| 43 | −32.04711 | 0.200 | | | |
| 44 | −28.63844 | 2.718 | 2.00100 | 29.13 | 0.59952 |
| 45 | −76.00618 | 20.000 | | | |
| 46 | ∞ | 1.500 | 1.51680 | 64.20 | 0.53430 |
| 47 | ∞ | 6.363 | | | |

TABLE 8

Example 4

| | WIDE | MIDDLE | TELE |
|---|---|---|---|
| Zr | 1.0 | 5.3 | 40.0 |
| f | 12.239 | 65.454 | 489.556 |

TABLE 8-continued

| | Example 4 | | |
|---|---|---|---|
| | WIDE | MIDDLE | TELE |
| Bf | 27.352 | 27.352 | 27.352 |
| FNo. | 3.61 | 3.61 | 4.60 |
| 2ω (°) | 38.8 | 7.6 | 1.0 |
| DD[8] | 4.021 | 83.415 | 118.747 |
| DD[18] | 163.234 | 71.795 | 5.184 |
| DD[26] | 1.869 | 13.913 | 45.194 |

EXAMPLE 5

Figure 10:
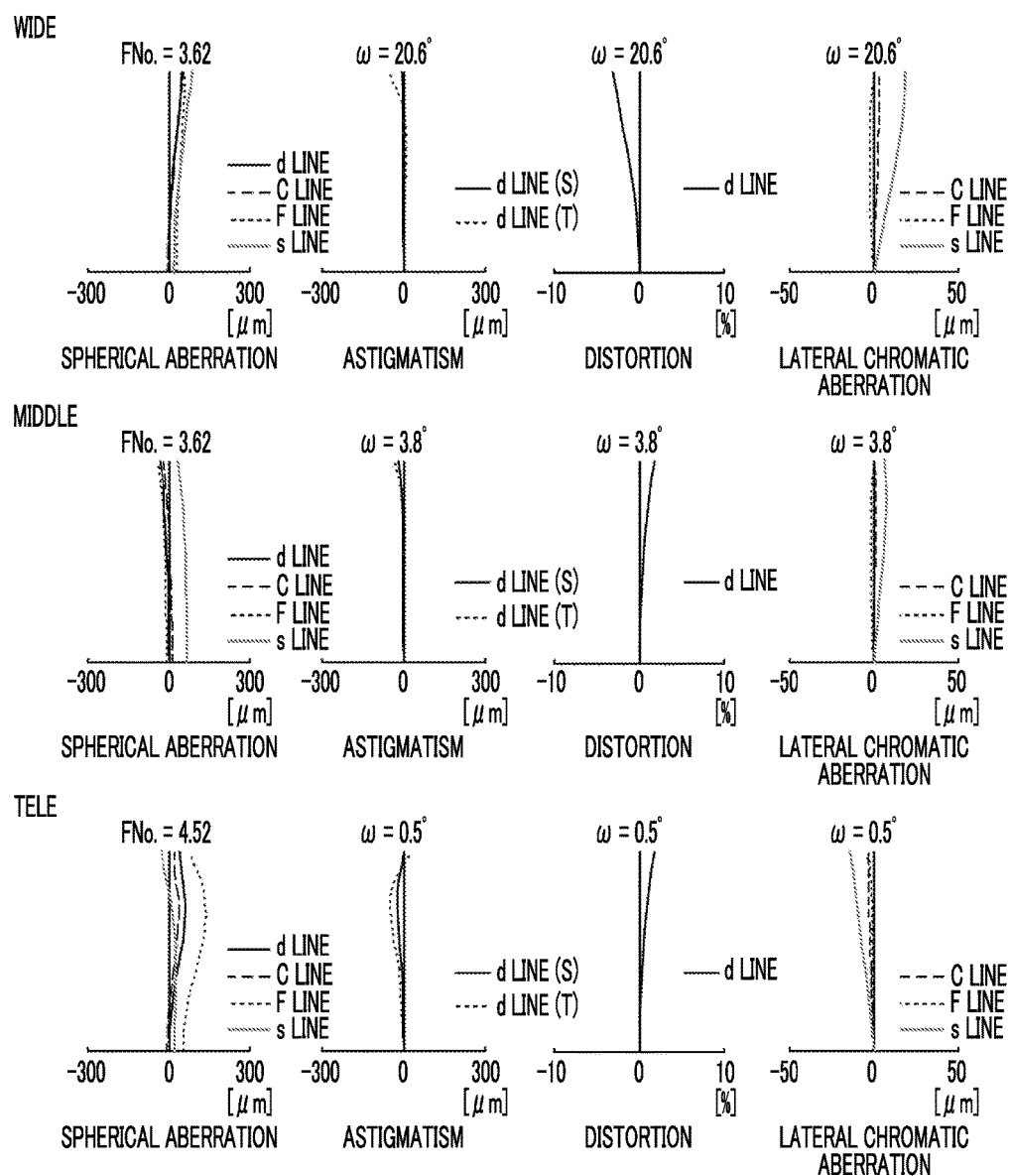
FIG. 10 is a diagram of aberrations of the zoom lens according to Example 5 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 5 shows a lens configuration and an optical path of a zoom lens of Example 5. The zoom lens of Example 5 is the same as that of Example 1 in terms of: the group configuration; the sign of the refractive powers of the respective lens groups; the lens groups that move during zooming; and the movement directions thereof. In the zoom lens of Example 5, the second A lens group G2A consists of two lenses L21 and L22 in order from the object side, and the second B lens group G2B consists of two lenses L23 and L24 in order from the object side, and the second C lens group G2C consists of two lenses L25 and L26 in order from the object side. The number of lenses composing each of the other lens groups of the zoom lens of Example 5 is the same as that of Example 1. Table 9 shows basic lens data of the zoom lens of Example 5, Table 10 shows specification and variable surface distances, and FIG. 10 shows aberration diagrams in a state where the object at the infinity is in focus.

TABLE 9

| | Example 5 | | | | |
|---|---|---|---|---|---|
| Si | Ri | Di | Ndj | vdj | θgFj |
| 1 | 131.55410 | 7.583 | 1.51680 | 64.20 | 0.53430 |
| 2 | 81.58994 | 23.043 | 1.49700 | 81.54 | 0.53748 |
| 3 | −560.44765 | 0.230 | | | |
| 4 | 132.42843 | 5.149 | 1.72000 | 43.69 | 0.56995 |
| 5 | 72.77751 | 17.918 | 1.49700 | 81.54 | 0.53748 |
| 6 | ∞ | 3.120 | | | |
| 7 | −345.88848 | 5.000 | 1.78590 | 44.20 | 0.56317 |
| 8 | −19122.52454 | DD[8] | | | |
| 9 | −758.26544 | 1.000 | 1.80610 | 40.93 | 0.57019 |
| 10 | 23.08854 | 6.483 | 1.78472 | 25.68 | 0.61621 |
| 11 | 92.85034 | 2.328 | | | |
| 12 | −171.73635 | 1.200 | 1.61800 | 63.33 | 0.54414 |
| 13 | 149.09550 | 2.117 | | | |
| 14 | −270.34758 | 3.291 | 1.61800 | 63.33 | 0.54414 |
| 15 | 90.23728 | 4.153 | | | |
| 16 | −47.72029 | 3.692 | 1.85026 | 32.27 | 0.59299 |
| 17 | −23.99247 | 1.210 | 1.69680 | 55.53 | 0.54341 |
| 18 | 583.77935 | DD[18] | | | |
| 19 | 78.82696 | 3.630 | 1.43875 | 94.66 | 0.53402 |
| 20 | −81.32788 | 0.100 | | | |
| 21 | 77.97033 | 2.666 | 1.91082 | 35.25 | 0.58224 |
| 22 | 37.71757 | 4.398 | 1.49700 | 81.54 | 0.53748 |
| 23 | −141.05498 | 0.100 | | | |
| 24 | 60.94207 | 4.051 | 1.49700 | 81.54 | 0.53748 |
| 25 | −71.03006 | 1.000 | 1.71300 | 53.87 | 0.54587 |
| 26 | −194.54583 | DD[26] | | | |
| 27 (St) | ∞ | 2.339 | | | |
| 28 | −60.97650 | 1.011 | 1.51823 | 58.90 | 0.54567 |
| 29 | 20.65321 | 2.032 | 1.90043 | 37.37 | 0.57720 |
| 30 | 37.27140 | 3.191 | | | |
| 31 | 39.04588 | 1.000 | 1.49700 | 81.54 | 0.53748 |
| 32 | 22.70986 | 0.853 | | | |
| 33 | 33.02110 | 3.000 | 1.64769 | 33.79 | 0.59393 |
| 34 | −58.14486 | 1.000 | | | |
| 35 | −69.23625 | 4.309 | 2.00100 | 29.13 | 0.59952 |
| 36 | 52.04042 | 36.968 | | | |
| 37 | 274.29930 | 7.367 | 1.69895 | 30.13 | 0.60298 |
| 38 | −130.08944 | 10.152 | | | |
| 39 | 51.50205 | 2.737 | 1.59522 | 67.73 | 0.54426 |
| 40 | −118.68721 | 3.282 | | | |
| 41 | 36.16043 | 1.000 | 1.80400 | 46.58 | 0.55730 |
| 42 | 16.40924 | 5.331 | 1.49700 | 81.54 | 0.53748 |
| 43 | −39.25083 | 0.199 | | | |
| 44 | −43.64519 | 1.000 | 1.91082 | 35.25 | 0.58224 |
| 45 | −173.30332 | 20.000 | | | |
| 46 | ∞ | 1.500 | 1.51680 | 64.20 | 0.53430 |
| 47 | ∞ | 5.330 | | | |

TABLE 10

| | Example 5 | | |
|---|---|---|---|
| | WIDE | MIDDLE | TELE |
| Zr | 1.0 | 5.3 | 40.0 |
| f | 12.222 | 65.362 | 488.868 |
| Bf | 26.319 | 26.319 | 26.319 |
| FNo. | 3.62 | 3.62 | 4.52 |
| 2ω (°) | 41.2 | 7.6 | 1.0 |
| DD[8] | 2.725 | 76.192 | 108.506 |
| DD[18] | 157.250 | 70.554 | 4.215 |
| DD[26] | 1.742 | 14.972 | 48.997 |

Table 11 shows values corresponding to the Conditional Expressions (1) to (9) of the zoom lenses of Examples 1 to 5. Values shown in Table 11 except the values corresponding to Conditional Expressions (4) and (5) are based on the d line.

TABLE 11

| Expression Number | | Example 1 | Example 2 | Example 3 | Example 4 | Example 5 |
|---|---|---|---|---|---|---|
| (1) | f2/f2B | 0.271 | 0.262 | 0.417 | 0.247 | 0.392 |
| (2) | fT/f2 | −21.688 | −22.711 | −22.777 | −21.236 | −21.473 |
| (3) | fT/f3 | 11.121 | 11.813 | 11.331 | 11.665 | 11.309 |
| (4) | θgFL34 − θgFL35 | −0.00839 | −0.00839 | −0.00593 | −0.00703 | −0.00839 |
| (5) | θgFL12 − θgFL11 | 0.00318 | 0.00318 | 0.00318 | 0.00318 | 0.00318 |
| (6) | (NL13 + NL15)/2 | 1.75295 | 1.75295 | 1.74372 | 1.76650 | 1.75295 |
| (7) | vL12 − vL11 | 17.34 | 17.34 | 17.34 | 17.34 | 17.34 |
| (8) | f1A/f1 | 1.131 | 1.128 | 1.164 | 1.076 | 1.113 |
| (9) | fT/f1 | 2.504 | 2.567 | 2.624 | 2.325 | 2.454 |

As can be seen from the above data, the zoom lenses of Examples 1 to 5 are lens systems having a long focal length of 480 mm or more, have a zoom ratio of 40 times as a high zoom ratio, and various aberrations including chromatic aberration throughout a wide wavelength range from the visible region to the near infrared range are satisfactorily corrected, whereby high optical performance is realized.

Figure 11:
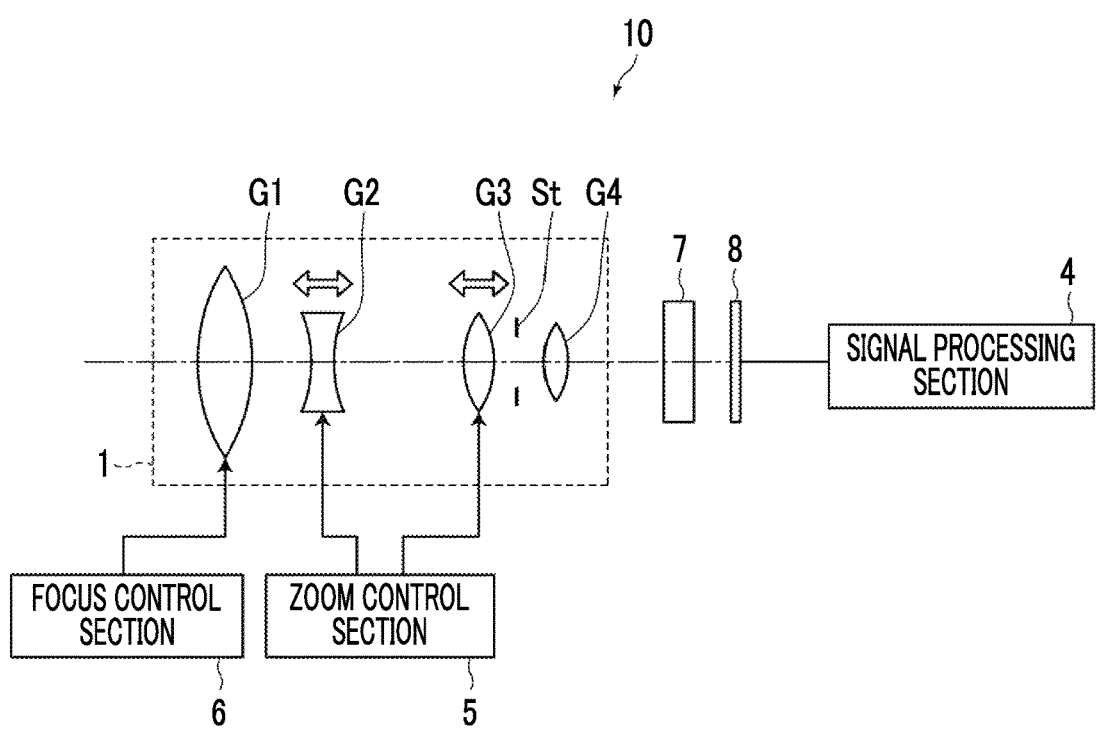
FIG. 11 is a schematic configuration diagram of an imaging apparatus according to an embodiment of the present invention.

Next, an imaging apparatus according to an embodiment of the present invention will be described. FIG. 11 is a schematic configuration diagram of an imaging apparatus 10 using the zoom lens 1 according to the above-mentioned embodiment of the present invention as an example of an imaging apparatus of an embodiment of the present invention. As the imaging apparatus 10, for example, there is a surveillance camera, a video camera, an electronic still camera, or the like.

The imaging apparatus 10 comprises a zoom lens 1; a filter 7 that is disposed on the image side of the zoom lens 1; an imaging element 8 that captures an image of a subject formed through the zoom lens; a signal processing section 4 that calculates an output signal from the imaging element 8; a zoom control section 5 that is for performing zooming of the zoom lens 1; and a focus control section 6 that is for focusing of the zoom lens 1. It should be noted that, in FIG. 11, each lens group is schematically illustrated. Further, although focusing is performed using the first lens group G1 in FIG. 11, in the present invention, focusing may be performed using a different lens group. The imaging element 8 captures the image of the subject formed through the zoom lens 1, converts the image into an electrical signal, and is disposed such that the imaging surface thereof is coplanar with the image plane of the zoom lens 1. As the imaging element 8, for example, it is possible to use a charge coupled device (CCD), a complementary metal oxide semiconductor (CMOS), or the like. It should be noted that FIG. 11 shows only one imaging element 8, but the imaging apparatus of the present invention is not limited to this, and may be a so-called three-plate imaging device having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

What is claimed is:

1. A zoom lens consisting of, in order from an object side:
a first lens group that has a positive refractive power;
a second lens group that has a negative refractive power;
a third lens group that has a positive refractive power;
a stop; and
a fourth lens group that has a positive refractive power,
wherein during zooming from a wide-angle end to a telephoto end, the first lens group, the stop, and the fourth lens group remain stationary with respect to an image plane, and the second lens group moves toward an image side along an optical axis, and the third lens group moves toward the object side along the optical axis,
wherein the second lens group consists of, in order from the object side, a second A lens group that has a negative refractive power, a second B lens group that has a negative refractive power, and a second C lens group that has a negative refractive power,
wherein the second A lens group has a cemented lens, which is formed by cementing a negative lens and a positive lens in order from the object side, at a position closest to the image side, and consists of three or less lenses,
wherein each of all lenses included in the second B lens group is a single lens having a negative refractive power,
wherein the second C lens group consists of a cemented lens which is formed by cementing a positive lens and a negative lens in order from the object side, and
wherein assuming that a focal length of the second lens group is f2 and a focal length of the second B lens group is f2B, Conditional Expression (1) is satisfied $$0.01 < f2/f2B < 1 \qquad (1).$$

2. The zoom lens according to claim 1, wherein a cemented surface of the cemented lens of the second A lens group is convex toward the object side, and a cemented surface of the cemented lens of the second C lens group is convex toward the image side.

3. The zoom lens according to claim 1, wherein during zooming from the wide-angle end to the telephoto end, the second lens group and the third lens group simultaneously pass points at which respective lateral magnifications thereof are −1 times.

4. The zoom lens according to claim 1, wherein assuming that a focal length of the whole system at the telephoto end is fT, Conditional Expression (2) is satisfied $$-40 < fT/f2 < -10 \qquad (2).$$

5. The zoom lens according to claim 1, wherein assuming that a focal length of the whole system at the telephoto end is fT and a focal length of the third lens group is f3, Conditional Expression (3) is satisfied $$5 < fT/f3 < 30 \qquad (3).$$

6. The zoom lens according to claim 1, wherein the third lens group consists of, in order from the object side, a third A lens group consisting of one positive lens, a third B lens group consisting of a cemented lens that is formed by cementing a negative meniscus lens, which is convex toward the object side, and a positive lens in order from the object side, and a third C lens group consisting of a cemented lens that is formed by cementing a positive lens, which is convex toward the image side, and a negative lens in order from the object side.

7. The zoom lens according to claim 6, wherein assuming that a partial dispersion ratio of the positive lens of the third C lens group between a g line and an F line is θgFL34 and a partial dispersion ratio of the negative lens of the third C lens group between the g line and the F line is θgFL35, Conditional Expression (4) is satisfied $$-0.02 < \theta gFL34 - \theta gFL35 < 0 \qquad (4).$$

8. The zoom lens according to claim 1, wherein the first lens group consists of, in order from the object side, a first A lens group consisting of a cemented lens that is formed by cementing a negative meniscus lens, which is convex toward the object side, and a positive lens in order from the object side and has a positive refractive power as a whole, a first B lens group consisting of a cemented lens that is formed by cementing a negative meniscus lens, which is convex toward the object side, and a positive lens in order from the object side and has a positive refractive power as a whole, and a first C lens group consisting of one negative lens.

9. The zoom lens according to claim 8, wherein assuming that a partial dispersion ratio of the negative meniscus lens of the first A lens group between a g line and an F line is θgFL11 and a partial dispersion ratio of the positive lens of the first A lens group between the g line and the F line is θgFL12, Conditional Expression (5) is satisfied $$0 < \theta gFL12 - \theta gFL11 < 0.02 \tag{5}$$

10. The zoom lens according to claim 8, wherein assuming that a refractive index of the negative meniscus lens of the first B lens group at a d line is NL13 and a refractive index of the negative lens of the first C lens group at the d line is NL15, Conditional Expression (6) is satisfied $$1.55 < (NL13 + NL15)/2 < 1.9 \tag{6}$$

11. The zoom lens according to claim 8, wherein assuming that an Abbe number of the negative meniscus lens of the first A lens group at the d line is vL11 and an Abbe number of the positive lens of the first A lens group at the d line is vL12, Conditional Expression (7) is satisfied $$5 < vL12 - vL11 < 40 \tag{7}$$

12. The zoom lens according to claim 8, wherein assuming that a focal length of the first A lens group is f1A and a focal length of the first lens group is f1, Conditional Expression (8) is satisfied $$0.7 < f1A/f1 < 2 \tag{8}$$

13. The zoom lens according to claim 1, wherein assuming that a focal length of the whole system at the telephoto end is fT and a focal length of the first lens group is f1, Conditional Expression (9) is satisfied $$1 < fT/f1 < 4 \tag{9}$$

14. The zoom lens according to claim 1,
wherein the fourth lens group consists of, in order from the object side, a front group and a rear group that is separated from the front group by a longest air gap on the optical axis in the fourth lens group,
wherein the rear group has, in order from the object side, a single lens that has a positive refractive power, and a cemented lens that is formed by cementing a positive lens and a negative meniscus lens, which is concave toward the image side, in order from the object side.

15. The zoom lens according to claim 1, wherein Conditional Expression (1-1) is satisfied $$0.1 < f2/f2B < 0.7 \tag{1-1}$$

16. The zoom lens according to claim 4, wherein Conditional Expression (2-1) is satisfied $$-30 < fT/f2 < -15 \tag{2-1}$$

17. The zoom lens according to claim 5, wherein Conditional Expression (3-1) is satisfied $$7 < fT/f3 < 15 \tag{3-1}$$

18. The zoom lens according to claim 7, wherein Conditional Expression (4-1) is satisfied $$-0.01 < \theta gFL34 - \theta gFL35 < 0 \tag{4-1}$$

19. The zoom lens according to claim 9, wherein Conditional Expression (5-1) is satisfied $$0 < \theta gFL12 - \theta gFL11 < 0.01 \tag{5-1}$$

20. An imaging apparatus comprising the zoom lens according to claim 1.

* * * * *